US008077540B2

(12) United States Patent
Williams

(10) Patent No.: US 8,077,540 B2
(45) Date of Patent: Dec. 13, 2011

(54) SYSTEM AND METHOD FOR DETERMINING VECTOR ACOUSTIC INTENSITY EXTERNAL TO A SPHERICAL ARRAY OF TRANSDUCERS AND AN ACOUSTICALLY REFLECTIVE SPHERICAL SURFACE

(75) Inventor: Earl G Williams, Fairfax, VA (US)

(73) Assignee: The United States of America as represented by the Secretary of the Navy, Wahington, DC (US)

( * ) Notice: Subject to any disclaimer, the term of this patent is extended or adjusted under 35 U.S.C. 154(b) by 430 days.

(21) Appl. No.: 12/484,894

(22) Filed: Jun. 15, 2009

(65) Prior Publication Data

US 2010/0316231 A1 Dec. 16, 2010

Related U.S. Application Data

(60) Provisional application No. 61/061,020, filed on Jun. 13, 2008.

(51) Int. Cl.
*G03H 5/00* (2006.01)

(52) U.S. Cl. ........................................................ 367/8

(58) Field of Classification Search .............. 367/8, 140, 367/118; 381/26; 348/515
See application file for complete search history.

(56) References Cited

U.S. PATENT DOCUMENTS

| | | | |
|---|---|---|---|
| 4,415,996 | A | 11/1983 | Maynard et al. |
| H001330 | H | 7/1994 | Williams |
| 5,592,441 | A | 1/1997 | Kuhn |
| 6,172,940 | B1 | 1/2001 | McConnell et al. |
| 7,058,184 | B1 | 6/2006 | Hickling |
| 7,123,548 | B1 | 10/2006 | Uzes |
| 7,599,248 | B2 * | 10/2009 | Williams .......................... 367/8 |
| 7,839,721 | B1 * | 11/2010 | Clark ............................ 367/119 |
| 2008/0232192 | A1 * | 9/2008 | Williams .......................... 367/8 |
| 2009/0028347 | A1 | 1/2009 | Duraiswami et al. |
| 2010/0316231 | A1 * | 12/2010 | Williams ........................ 381/92 |

OTHER PUBLICATIONS

Herdic, P. C., Houston, B. H., Marcus, M. H., Williams, E. G., Baz, A. M., "The Vibro-Acoustic Response and Analysis of a Full-Scale Aircraft Fuselage Section for Interior Noise Reduction," *Journal of the Acoustical Society of America*, vol. 11, No. 6, pp. 3667-3678, Jun. 2005.

Houston, B. H., Marcus, M. H., Bucaro, J. A., Williams, E.G., Photiadis, D. M., "The Structural Acoustics and Active Control of Interior Noise in a Ribbed Cylindrical Shell," Journal of the Acoustical Society of America, vol. 99, No. 6, pp. 3497-3512, Jun. 1996.

(Continued)

*Primary Examiner* — Daniel Pihulic
(74) *Attorney, Agent, or Firm* — Amy L. Ressing; Sally A. Ferrett

(57) ABSTRACT

A system and computer implemented method for determining and displaying vector acoustic intensity fields based on signals from a rigid spherical array of acoustic sensors within a volume external to the array. The method includes a propagator with a ratio of Green's functions for the location within the volume and for the spherical array radius, and a Tikhonov regularization filter that uses the Morozov discrepancy principle on the measured noise variance and Fourier coefficients of the measured partial pressures with respect to reference accelerometer or microphone measurements.

26 Claims, 18 Drawing Sheets

OTHER PUBLICATIONS

Sklanka, B.J., Tuss, J.R., Buehrle, R.D., Klos, J., Williams, E.G., Valdivia, N., "Acoustic Source Localization in Aircraft Interiors Using Microphone Array Technologies", paper No. AIAA-2006-2714, 12th AIAA/CEAS Aeroacoustics Conference, Cambridge MA, May 2006.

Valdivia, N.P., Williams, E.G., "Reconstruction of the acoustic field using patch surface measurements", Proceedings Thirteenth International Congress on Sound and Vibration, Vienna, Austria, Jul. 2006.

Williams, E. G., et al., "Tracking energy flow using a Volumetric Acoustic Intensity Imager (VAIM)", presentation slides, Inter-noise 2006, Hawaii, Dec. 5, 2006, pp. 1-25.

Willliams, E.G., "A Volumetric Acoustic Intensity Probe based on Spherical Nearfield Acoustical Holography", Proceedings Thirteenth International Congress on Sound and Vibration, Vienna, Austria, Jul. 2006.

Williams, E. G., Fourier Acoustics: Sound Radiation and Nearfield Acoustical Holography, Academic Press Inc., 1999, Ch. 7, pp. 235-249.

Williams, E.G., "Volumetric Acoustic Intensity Probe", 2006 NRL Review, pp. 110-111, Dec. 2006.

Williams, E. G., "Continuation of Acoustic Near-Fields," Journal of the Acoustical Society of America, vol. 113, No. 3, pp. 1273-1281, Mar. 2003.

Williams, E. G., "Regularization Methods for Near-Field Acoustical Holography," *Journal of the Acoustical Society of America*, vol. 110, No. 4, pp. 1976-1988, Oct. 2001.

Williams, E. G., Valdivia, N., Herdic, P. C., Klos, J., "Volumetric Acoustic Vector Intensity Imager," Journal of the Acoustical Society of America, vol. 120, No. 4, pp. 1887-1897, Oct. 2006.

Williams, E. G., Valdivia, N.P., Klos, J., "Tracking energy flow using a Volumetric Acoustic Intensity Imager (VAIM)", paper presented at Inter-noise 2006, Hawaii, Dec. 3-6, 2006, pp. 1-10.

Williams, E. G., Houston, B. H., Herdic, P. C., Raveendra, S. T., Gardner, B., "Interior Near-Field Acoustical Holography in Flight," Journal of the Acoustical Society of America, vol. 108, No. 4, pp. 1451-1463, Oct. 2000.

Williams, E. G., Houston, B. H., Herdic, P. C., "Fast Fourier Transform and Singular Value Decomposition Formulations for Patch Near-Field Acoustical Holography," Journal of the Acoustical Society of America, vol. 114, No. 3, pp. 1322-1333, Sep. 2003.

* cited by examiner

SYSTEM AND METHOD FOR DETERMINING VECTOR ACOUSTIC INTENSITY EXTERNAL TO A SPHERICAL ARRAY OF TRANSDUCERS AND AN ACOUSTICALLY REFLECTIVE SPHERICAL SURFACE

CROSS-REFERENCE TO RELATED APPLICATIONS

This Application is a non-provisional under 35 USC 119(e) of, and claims the benefit of, U.S. Provisional Application 61/061,020 filed on Jun. 13, 2008, the entire disclosure of which is incorporated herein by reference.

BACKGROUND OF THE INVENTION

1. Technical Field

This application is related to determining the source and intensity of acoustic sources, and more particularly, to methods for determining vector acoustic intensity using a spherical array of microphones.

2. Description of Related Technology

Microphones and microphone arrays are often used to measure sound pressure levels, for various reasons, for example, to isolate the mechanical source of a troublesome noise. To determine a sound intensity vector, current devices typically include one, two, or three pairs of microphones. For example, a four-microphone sound intensity vector probe is described in U.S. Pat. No. 7,058,184 to Hickling, the disclosure of which is incorporated herein by reference in its entirety. An underwater acoustic intensity probe with a pair of geophones is described in commonly assigned U.S. Pat. No. 6,172,940 to McConnell et al.

A spherical microphone array for detecting, tracking, and reconstructing signals in spectrally competitive environments is disclosed in U.S. Pat. No. 7,123,548 to Uzes.

Aspects of near field acoustic holography (NAH) are discussed in Nicholas P. Valdiva and Earl G. Williams, "Reconstruction of the acoustic field using patch surface measurements", presented at the Thirteenth International Congress on Sound and Vibration on Jul. 2-6, 2006. Additional aspects are discussed in *Fourier Acoustics, Sound Radiation and Nearfield Acoustical Holography*, Earl G. Williams, Academic Press, London, 1999, Chapter 7.

Aspects of a volumetric acoustic intensity probe are discussed in B. Sklanka et. al., "Acoustic Source Localization in Aircraft Interiors Using Microphone Array Technologies", paper no. AIAA-2006-2714, 12th AIAA/CEAS Aeroacoustics Conference, Cambridge Mass., presented on May 8-10, 2006, and in E. G. Williams, N. Valdivia, P. C. Herdic, and Jacob Klos "Volumetric Acoustic Vector Intensity Imager", Journal of the Acoustic Society of America, Volume 120, Issue 4, pages 1887-1897, October 2006.

Additional discussion of volumetric acoustic intensity probes with an open and acoustically transparent array spherical array is found in Earl G. Williams, "A Volumetric Acoustic Intensity Probe based on Spherical Nearfield Acoustical Holography", Proceedings 13th International Congress on Sound and Vibration, Vienna, Austria, July 2006, and in Nicolas Valdivia, Earl G. Williams, "Reconstruction of the acoustic field using partial surface measurements", Proceedings 13th International Congress on Sound and Vibration, Vienna, Austria, July 2006, and in Earl G. Williams, "A Volumetric Acoustic Intensity Probe based on Spherical Nearfield Acoustical Holography", presented at the Thirteenth International Conference on Spherical Nearfield Acoustical Holography, on Jul. 2-6, 2006. Further aspects are discussed in Earl. G. Williams, Nicholas P. Valdiva, and Jacob Klos, "Tracking energy flow using a Volumetric Acoustic Intensity Imager (VAIM)", Internoise 2006, held on 3-6 Dec. 2006, and in Earl G. Williams, "Volumetric Acoustic Intensity Probe", NRL Review, 2006.

U.S. Patent Publication No. 2008/0232192 (Ser. No. 11/959,454) to Williams discloses a Volumetric Acoustic Intensity Probe with an open and acoustically transparent array spherical array. The entire disclosure of this document is incorporated by reference herein.

SUMMARY

An aspect of the invention is directed to a system for determining vector acoustic intensity at locations in a volume external to a spherical array of microphones, the array of microphones having an acoustically reflective frame. The system includes an analog to digital converter for digitizing pressure data from each microphone in the spherical array and for digitizing data from at least one reference microphone or accelerometer exterior to the array and a computer processor for determining the acoustic intensity at each location. The computer processor has computer software adapted to apply a propagator to spherical wave equations for pressure and velocity to determine the vector acoustic intensity. The propagator includes a regularization filter and a ratio of Green's functions for the location r and for the spherical array radius a.

The regularization filter depends on a frequency and a signal to noise ratio at the microphone locations, and has regularization filter has filter coefficients of 0, 1, or a fraction between 0 and one. The regularization filter results from applying from Tikhonov regularization to the spherical geometry of the array and a Morozov discrepancy principle to measured noise variance and Fourier coefficients.

The acoustic intensity is determined at locations within a volume having a radius between one and four times the radius of the spherical array of microphones.

The system can include a computer display connected to an output of the processor showing magnitude and direction of the vector acoustic intensity at the locations outside the spherical array.

An aspect of the invention is directed to a computer implemented method for determining vector acoustic intensity at locations in a volume external to a spherical array of microphones, the array of microphones having an acoustically reflective frame. The method includes receiving from an analog to digital converter digitized pressure data from each microphone in the spherical array and digital data from at least one reference microphone or accelerometer exterior to the array and applying a propagator to spherical wave equations for pressure and velocity to determine the vector acoustic intensity. The propagator includes regularization filter and a ratio of Green's functions for the location r and for the spherical array radius a. The analog to digital converter receives analog electrical signals from the plurality of microphones and references and converts the analog electrical signals into digital signals.

The regularization filter depends on a frequency and a signal to noise ratio at the microphone locations. The regularization filter has filter coefficients of 0, 1, or a fraction between 0 and one. The regularization filter results from applying from Tikhonov regularization to the spherical geometry of the array and the Morozov discrepancy principle to measured noise variance and Fourier coefficients.

For a spherical wave equation for pressure, the propagator is $$\sum_{n=0}^{N} F_n^{\alpha} \frac{G_n(r)}{G_n(a)}.$$

For a spherical wave equation for velocity in a θ or ϕ direction, the propagator is $$\sum_{n=0}^{N} F_n^{\alpha} \frac{G_n(r)}{rG_n(a)}.$$

For a spherical wave equation for velocity in an R direction, the propagator is $$\sum_{n=0}^{N} F_n^{\alpha} \frac{G_n'(r)}{G_n(a)}.$$

The acoustic intensity is determined at locations within a volume having a radius between one and four times the radius of the spherical array of microphones.

The system and method can also include displaying on a computer screen the magnitude and the direction of the vector acoustic intensity at the locations outside the spherical array. The magnitude of the vector acoustic intensity can be represented by the length of a cone pointing in the direction of the vector acoustic intensity. The magnitude of the vector acoustic intensity can be represented by a variation in color. Additional aspects will be apparent upon review of the following drawings and Detailed Description.

DETAILED DESCRIPTION OF EMBODIMENTS OF THE INVENTION

Figure 1:
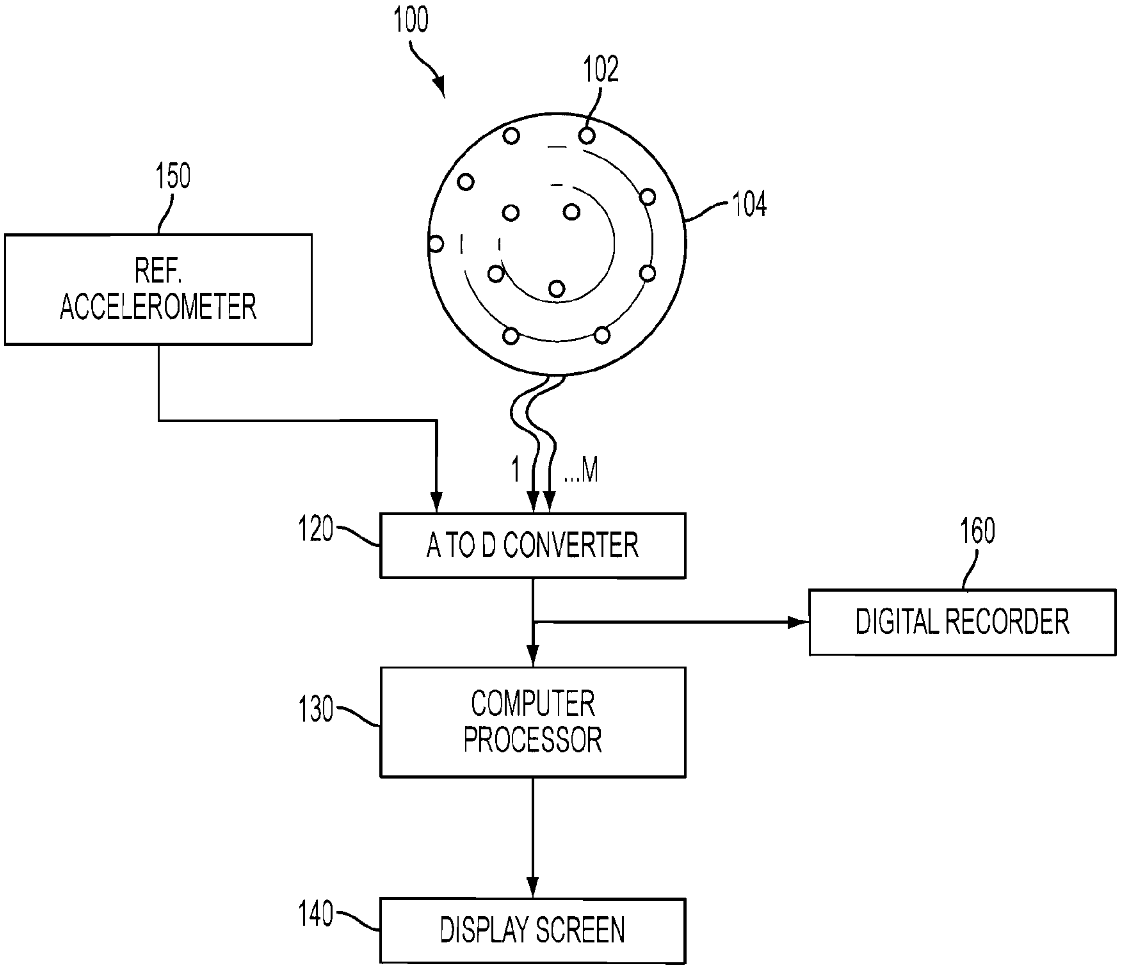
FIG. 1 shows an embodiment of an exemplary system for determining acoustic vector intensity.

FIG. 1 illustrates an exemplary embodiment of a spherical array and the processing system and method for determining acoustic intensity vector maps in a volume using a spherical array of acoustic sensors in accordance with an embodiment of the invention.

The array 100 includes a number of microphones 102 arranged in a spherical shape. The microphones 102 are preferably arranged outward facing and flush mounted in an acoustically reflective spherical frame 104 or shell. An exemplary spherical array is manufactured by Nittobo Acoustic Engineering Co., Ltd., headquartered in Tokyo, Japan.

Each of the microphones produces an electrical signal with a voltage corresponding to the acoustic pressure at that microphone location.

An analog to digital converter 120 receives the analog electrical voltage signals from the array microphones and converts the analog microphone electrical signals into digital signals for each channel, with one channel corresponding to one microphone. The analog to digital converter 120 is an electronic circuit or device and has at least Q+M channels, where M is the number of microphones in the array 100, and Q is the number of reference microphones or accelerometers when the system is used in the partial field decomposition mode.

The digital signals from the analog to digital recorder are transferred to a computer processing system 130, which receives the digital signals and determines the acoustic vector intensity at many different locations within a volume exterior to the spherical array of microphones. The acoustic vector intensity at the different locations is displayed to a user in a manner that allows the user to quickly determine the location of greatest acoustic vector intensity, which can assist the user in determining the source of the noise.

The signals from the microphone can be communicated to the processor in real time, for nearly simultaneous analysis of the data, or can be recorded and stored for future analysis using a digital recorder 160.

The spherical array can be stationary, or can be mounted on a moving platform for moving the array through the volume to be acoustically tested. An example, the array can be moved in or around machinery, ships, land vehicles, or aircraft, in order to locate unwanted acoustic sources. As the array is moved through or around the area to be tested, the vector intensity is determined at different positions within the test volume, which extends outward from the spherical array to a radius of about two to four, and more particularly, about three times the spherical array radius. The vector intensity will indicate the likely source of the sound.

The resulting vector acoustic intensity at the different locations can be displayed overlaid onto images of machinery or other possible noise sources on a display screen 140 or other device.

The processor 130 includes both hardware including a computer, as described further herein, and software, including computer readable media including instructions for carrying out a method for transforming the input microphone signals into an illustration of the acoustic vector intensities at locations external to the spherical microphone array.

Figure 2:
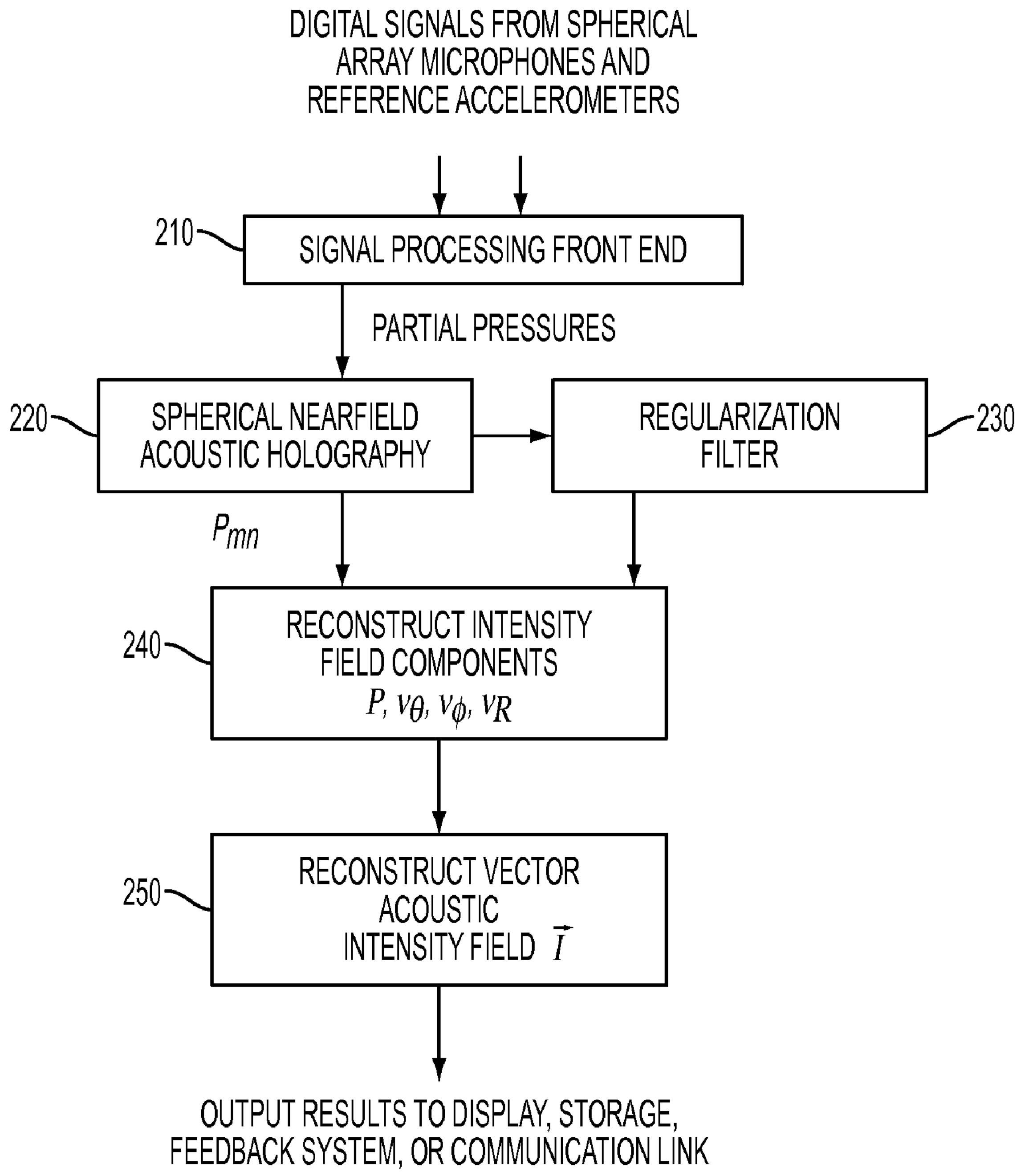
FIG. 2 illustrates steps in the exemplary method for determining acoustic intensity vector maps in a volume using a spherical array of acoustic sensors in accordance with an embodiment of the invention.

FIG. 2 illustrates a schematic of a method 200 for determining acoustic intensity vectors in a volume using a spherical array of acoustic sensors according to an embodiment of the invention.

The system can use an "instantaneous mode" of operation, or a partial field decomposition mode of operation. In the instantaneous mode, the array microphones are simultaneously sampled for a period of time at a sampling rate. The data is transformed using an analog to digital converter. A FFT transforms the digitized time domain data into frequency domain information. At one frequency, the equations for intensity are applied and vector intensity is determined. Subsequently, the sampled data from the next block of time is considered.

In a partial field decomposition mode, the system can also determine the effect of various acoustic sources on the vector intensity field. In this mode, reference accelerometers 150, microphones, or other sensors are located on suspected noise sources within the test volume and external to the microphone array. For example, the reference accelerometers can be placed on an aircraft panel or a machinery component. The accelerometers are sampled, the analog samples are converted to digital, and the digitized data is transformed with a FFT into the frequency domain.

Signal Processing Front End

The analog to digital converter provides digitized microphone data to be processed in the processor's signal processing front end 210. The front end is configured assuming that the acoustic sources outside the array can be random in nature. The signal processing is based on power spectral density analysis, that is, the ensemble averaged cross correlations between the microphones and all of the references.

The signal processing front end 210 is an electronic device that can be located with the analog to digital converter inside the hollow space internal to the microphone array, or in another location. The signal processing front end transforms each of the incoming digital signals from the microphones and the A-D converter into Q partial pressure fields referenced to the external reference accelerometers.

In one example, a single measurement ensemble of length T seconds is 1024 time points and the sample rate is 12000 samples per second. Estimates of cross spectral density functions are computed taking $n_d$ ensemble averages, according to the equation:

$$\hat{S}_{p_i r_j} = \frac{1}{T}\frac{1}{n_d}\sum_{k=1}^{n_d} P_{ki}(f) * R_{kj}(f) = \bar{\varepsilon}[P_{ki}(f) * R_{kj}(f)], \quad \text{Equation (1)}$$

where $P_{ki}(f)$ is the fast Fourier transform (FFT) of the pressure at array microphone location i for ensemble number k, and $R_{kj}(f)$ is the FFT of the pressure of the reference microphone or accelerometer at reference position j. The value of $n_d$ is chosen in the software, and depends on the complexity of the sources that are being studied. When P=R, then $\hat{S}_{pr}$ provides a matrix composed of auto and cross power spectra between all the references which are denoted as the matrix $S_{xx}$:

$$S_{xx} = \begin{pmatrix} S_{x1x1} & S_{x1x2} & S_{x1x3} & \cdots \\ S_{x2x1} & S_{x2x2} & S_{x2x3} & \cdots \\ S_{x3x1} & S_{x3x2} & S_{x3x3} & \cdots \\ \cdots & \cdots & \cdots & \cdots \end{pmatrix}. \quad \text{Equation (2)}$$

Here, $\bar{\epsilon}$ represents the ensemble average over the ensemble number k and $$S_{x_i x_j} = \bar{\epsilon}[R_{ki}(f)^* R_{kj}(f)]. \quad \text{Equation (2)}$$

Similarly, the cross power spectral densities are computed between the spherical array microphone signals and the designated reference set of microphones as:

$$S_{x_i p_j} = \bar{\epsilon}[R_{ki}^*(f) P_{kj}(f)]. \quad \text{Equation (3)}$$

If the system includes M microphones and Q reference accelerometers or microphones, the matrix $S_{xp}$ is $$S_{xp} = \begin{pmatrix} S_{x1p1} & S_{x1p2} & \cdots & S_{x1pM} \\ S_{x2p1} & S_{x2p2} & \cdots & S_{x2pM} \\ \cdots & \cdots & \cdots & \cdots \\ S_{xQp1} & S_{xQp2} & \cdots & S_{xQpM} \end{pmatrix}. \quad \text{Equation (4)}$$

Note that in Equation (1)-(4), the orders of the references are ranked in order of average coherence for each frequency. For example, x1 is the most highly ranked reference with respect to the average coherence for each frequency, and x2 is the next highly ranked reference with respect to the average coherence for each frequency, and so on.

A Cholsky decomposition is applied to the matrices $S_{xx}$, so the matrix $S_{xx}=T^H T$ and a set of Q partial pressure fields $p_{hi}(a,\Omega)$ for i=1, 2, . . . Q is determined according to the equations:

$$P(f) = \begin{pmatrix} P_{1,1} & P_{1,2} & \cdots & P_{1,M} \\ P_{2,1} & P_{2,2} & \cdots & P_{2,M} \\ \cdots & \cdots & \cdots & \cdots \\ P_{Q,1} & \cdots & \cdots & P_{Q,M} \end{pmatrix} = \begin{pmatrix} p_{h1}(a, \Omega) \\ p_{h2}(a, \Omega) \\ \cdots \\ p_{hQ}(a, \Omega) \end{pmatrix} \quad \text{Equation (5)}$$

$$\text{and } P(f) = (T^H)^{-1} S_{xp}. \quad \text{Equation (6)}$$

The rows of the matrix P(f) form Q separate holograms ranked in order of importance, each of which can be used to reconstruct the volumetric intensity at a given frequency. These partial pressure fields $p_{hi}(a,\Omega)$ are the input $p(a,\theta_i,\phi_i)$ to software modules 220 and 230 that determine both the regularization filter and the spherical NAH components of the reconstructed pressure and velocities.

Spherical NAH Using Regularization Filters

For spherical arrays of microphones, the acoustic intensity fields $p(a,\theta_i,\phi_i)$ at a sphere of radius a, at a frequency ω, can be written according to the following double sum:

$$p(a,\theta_i,\varphi_i)=\sum_{n=0}^{N}\sum_{m=-n}^{n}P_{mn}(a,\omega)Y_n^m(\theta_i,\phi_i). \quad \text{Equation (7)}$$

Here, $p(a,\theta_i,\phi_i)$ is the acoustic pressure at a location a,θ,ϕ within a spherical volume surface of radius a centered at the center of the spherical array. The $Y_n^m(\theta_i,\phi_i)$ values are orthonormal spherical harmonic functions of degree n and order m at a point in the volume at angle $(\theta_i,\phi_i)$ of the ith microphone in the array. The ω is the angular acoustic frequency of interest. The value of "a" is the radius of the array. The density of the media in which the array is located is ρ.

The unknown Fourier coefficients $P_{mn}$ are computed by inverting Equation (1) and treating $P_{mn}$ as a vector P, treating $p(a,\theta_i,\phi_i)$ as a vector p of measured values of the acoustic pressure at a location $p(a,\theta_i,\phi_i)$, and treating the spherical harmonics $Y_n^m(\theta_i,\phi_i)$ as a matrix Y, so that p=YP.

A singular value decomposition of Y yields $Y=U\Sigma V^H$. Thus, the vector P of $P_{mn}$ values is found according to the equation $$P=V\Sigma^{-1}U^H \quad \text{Equation (8)}$$

Note that for the rigid sphere, all the inverse singular values are used as the inverse is well conditioned.

Once the regularization filter 230 and Fourier coefficients are determined using spherical nearfield acoustic holography technique 220 of Equation (8), reconstruction of the acoustic velocity vector field components $v_\Theta(r,\omega)$, $v_\Phi(r,\omega)$, and $v_R(r,\omega)$ at a frequency ω and a location r≡(r,θ,ϕ) exterior to the spherical array are calculated 240 according to:

$$v_\theta(r,\omega)=\frac{1}{i\omega\rho}\sum_{n=0}^{N}F_n^\alpha\frac{G_n(r)}{rG_n(a)}\sum_{m=-n}^{n}P_{mn}(a,\omega)\partial Y_n^m(\theta,\phi)/\partial\theta \quad \text{Equation (9)}$$

$$v\phi(r,\omega)=\frac{1}{i\omega\rho}\sum_{n=0}^{N}F_n^\alpha\frac{G_n(r)}{rG_n(a)}\sum_{m=-n}^{n}P_{mn}(a,\omega)imY_n^m(\theta,\phi)/\sin(\theta) \quad \text{Equation (10)}$$

$$v_R(r,\omega)=\frac{1}{i\omega\rho}\sum_{n=0}^{N}F_n^\alpha\frac{G_n(r)}{rG_n(a)}\sum_{m=-n}^{n}P_{mn}Y_n^m(\theta,\phi). \quad \text{Equation (11)}$$

Reconstruction of the acoustic pressure at any location r≡(r,θ,ϕ) external to the spherical array is determined according to:

$$p(r,\omega)=\sum_{n=0}^{N}F_n^\alpha\frac{G_n'(r)}{G_n(a)}\sum_{m=-n}^{n}P_{mn}(a,\omega)Y_n^m(\theta,\phi). \quad \text{Equation (12)}$$

The $$F_n^\alpha\frac{G_n(r)}{rG_n(a)}$$

term in Equations (9)-(12) is a regularization filter based on Green's function $$\frac{G_n(r)}{G_n(a)},$$

the filter having a value less than or equal to one and greater than or equal to zero.

The ratio of the Green's function for the location r to the Green's function for the array radius a, $$\frac{G_n(r)}{G_n(a)},$$

is equal to $$\frac{G_n(r)}{G_n(a)}=(ka)^2(j_n(kr)y_n'(ka)-j_n'(ka)y_n(kr)), \quad \text{Equation (13)}$$

where the $j_n(x)$ and $y_n(x)$ terms are the first and second kinds of spherical Bessel functions, respectively, and $y_n(x)$ is also known as the Neumann function. The spherical Bessel function $j_n(x)$ is related to an ordinary Bessel function $J_n(x)$ according to $$j_n(x)=\sqrt{\frac{\pi}{2x}}J_{n+1/2}(x). \quad \text{Equation (14)}$$

The rigid surface of the sphere imposes the boundary condition $\partial G_n(r)/\partial r=0$ at the sphere surface (r=a) on equation (13).

In the equations (9)-(12) above, the value n (an integer) is incremented from 0 to N, where N is a predetermined integer that can be selected based on the number of microphones in the array. For example, a 31 microphone spherical array will have an integer value of N=4. Arrays with more microphones can have a larger N.

Regularization Filter

At low frequencies, e.g., below about 1000 Hz, the spherical NAH equation (equation (1) above) will produce errors in the acoustic vector intensity. The regularization filter 230 is applied to the spherical nearfield acoustic holography determination of the acoustic vector intensity to provide better results. The filter setting depends on the signal to noise ratio (SNR) of the microphone array, the noise variance, and the angular frequency ω.

This regularization filter is applied through the pressure and velocity equations above inside the summation providing weights for each value of n from n=0 to N shown as $$F_n^\alpha.$$

The filter weights allow accurate determination of the Fourier coefficients for the microphones at low frequencies. The purpose of the regularization filter is to minimize error which can arise in reconstructing the pressure and velocity vector fields as a function of r in the presence of noise.

The signal to noise ratio for each of the Fourier coefficients $P_{mn}$ at a particular frequency and location is determined according to:

$$\sigma = 1/3\sqrt{\sum_{m=-4}^{4} |P_{mn}|^2} \quad \text{for } n = 4 \qquad \text{Equation (15)}$$

and $$SNR = 20\log_{10}\left(\sqrt{\sum_{i=1}^{M} |p_h(a,\Omega)|^2} \Big/ \left(\sigma\sqrt{M}\right)\right) \qquad \text{Equation (16)}$$

where the Fourier coefficients $P_{mn}$ of the pressure are determined in accordance with Equation (8) using the partial pressures and the spherical harmonics as discussed above.

Once the SNR is determined, the quantity "$a_n$" is found according to:

$$a_n = \alpha\frac{G_n(r_{max})}{G_n(a)}, \qquad \text{Equation (17)}$$

where α depends on the SNR and the noise variance σ, and is found using the Morozov discrepancy principle by solving the following equation for α:

$$\sqrt{\sum_{n=0}^{4}\sum_{m=-n}^{n}(1-F_n^\alpha)^2|P_{mn}|^2} - \sigma\sqrt{M} = 0. \qquad \text{Equation (18)}$$

Equation (18) is monotonically increasing in α and the solution is determined numerically using a computer routine that finds the zero crossing (the value of α for which the left side of the equation equals zero). Additional discussion of the Morozov discrepancy principle is found in E. G. Williams, "Regularization Methods for near-field acoustical holography", J. Acoust. Soc. Am., Vol. 110, pp. 1976-1988 (2001).

The filter coefficient $F_n^\alpha$ is then found for each location, frequency, and reference hologram according to the equation:

$$F_n^\alpha = \frac{1}{1 + a_n\left(\frac{a_n}{1+a_n}\right)^2} \qquad \text{Equation (19)}$$

with the value of $a_n$ from Equation (17) and $r_{max}$=3.15a=0.41m.

Note that at frequencies above about 600 hertz, the filter coefficient $F_n^\alpha$ equals 1 for all values of n. At lower frequencies, the filter coefficient is 0, 1, or a fraction between 0 and 1.

Note that the $$\frac{G_n(r_{max})}{G_n(a)}$$

and $$\frac{G_n(r)}{G_n(a)}$$

terms relies only on the physical geometry of the array and test volume and the frequency (r,a,ω) and the first and second kind of spherical Bessel functions. The filter coefficient $F_n^\alpha$, however, depends on the signal to noise ratio, which in turn is determined based on the partial pressures and the Fourier coefficients, as shown in Equations (15)-(19).

Determination of Acoustic Vector Intensity

Having determined the vector acoustic pressure p and the vector acoustic velocities, the vector intensity is reconstructed 250 at any point in the volume as the product of the pressure and velocity, with units of energy per unit time (power) per unit time, typically (joules/s)/$m^2$ or watts/$m^2$. The value of the average acoustic intensity over a period T is found using the reconstructed pressure p(r,θ,ϕ) and volume from the equations above as $$\vec{I}(r,\omega) = \frac{1}{2}\text{Re}[p^*(v_\theta\hat{e}_\theta + v_\phi\hat{e}_\phi + v_R\hat{e}_R)] \qquad \text{Equation (20)}$$

where the $\hat{e}_\theta$, $\hat{e}_\phi$, and $\hat{e}_R$ terms represent unit vectors in the θ,ϕ, and R directions, respectively.

The intensity for each of the Q partial fields can be displayed separately or added together to produce a single display.

In an exemplary embodiment, the system includes a computer screen display that shows the vector intensity at various locations in the test volume. The magnitude of the intensity can be illustrated using a color change or as the length of an arrow, bar or other visual device, with the vector intensity display changing over time as additional microphone data is subsequently transformed into vector representations of the acoustic intensity.

EXAMPLES

In one example, a spherical array of 31 microphones flush mounted in a rigid sphere collects acoustical data for processing. The spherical frame is preferably formed of a lightweight, rigid, substantially acoustically reflective material such as nickel. The data in this example is collected from a commercially available spherical array flush mounted in a spherical shell and manufactured by Nittobo Acoustic Engineering Co., Ltd. The array has a radius of a=0.13 meters.

The array can be larger or smaller in size, and can have greater or fewer microphones, as determined by the cost of the microphones, the cost of electronics per channel, the desired volume, and the desired resolution.

The integer N appropriate for a 31 microphone array is 4, although a larger integer can be used for arrays with more microphones. For the 31 microphone array, the frequency range is zero to about 1000 Hz.

The array locations for the microphones in the Nittobo spherical array are shown in the table below, with all dimensions in meters.

| Mic. no. | X | Y | Z |
|---|---|---|---|
| 1 | 0.0154 | −0.1216 | 0.0433 |
| 2 | 0.0613 | −0.0613 | 0.0969 |
| 3 | 0 | 0 | 0.1300 |
| 4 | −0.0888 | −0.0238 | 0.0919 |
| 5 | −0.0742 | −0.0976 | 0.0433 |
| 6 | −0.0238 | −0.0888 | −0.0919 |
| 7 | 0.0474 | −0.1130 | −0.0433 |
| 8 | 0.1130 | −0.0474 | −0.0433 |
| 9 | 0.1216 | −0.0154 | 0.0433 |
| 10 | 0.0976 | 0.0742 | 0.0433 |
| 11 | 0.0238 | 0.0888 | 0.0919 |
| 12 | −0.0474 | 0.1130 | 0.0433 |
| 13 | −0.1130 | 0.0474 | 0.0433 |
| 14 | −0.1216 | 0.0154 | −0.0433 |
| 15 | −0.0976 | −0.0742 | −0.0433 |
| 16 | 0.0888 | 0.0238 | −0.0919 |
| 17 | 0.0742 | 0.0976 | −0.0433 |
| 18 | −0.0154 | 0.1216 | −0.0433 |
| 19 | −0.0613 | 0.0613 | −0.0969 |
| 20 | −0.0238 | −0.0888 | 0.0919 |
| 21 | −0.0330 | −0.1233 | −0.0244 |
| 22 | 0.0903 | −0.0903 | 0.0244 |
| 23 | 0.0888 | 0.0238 | 0.0919 |
| 24 | −0.0558 | 0.0558 | 0.1033 |
| 25 | −0.1233 | −0.0330 | 0.0244 |
| 26 | 0.0558 | −0.0558 | −0.1033 |
| 27 | 0.1233 | 0.0330 | −0.0244 |
| 28 | 0.0330 | 0.1233 | 0.0244 |
| 29 | −0.0903 | 0.0903 | −0.0244 |
| 30 | −0.0888 | −0.0238 | −0.0919 |
| 31 | 0.0238 | 0.0888 | −0.0919 |

A three dimensional grid of points separated by 0.06 m is used for the positions r=(r, θ, ϕ) at which the vector intensity will be determined. Note that larger or smaller grid size can be used depending on the desired resolution.

The test volume V is a sphere with a maximum radius of 0.4 meters from the center of the spherical array (3.15 times the spherical array radius of 0.13 m).

Figure 3A:
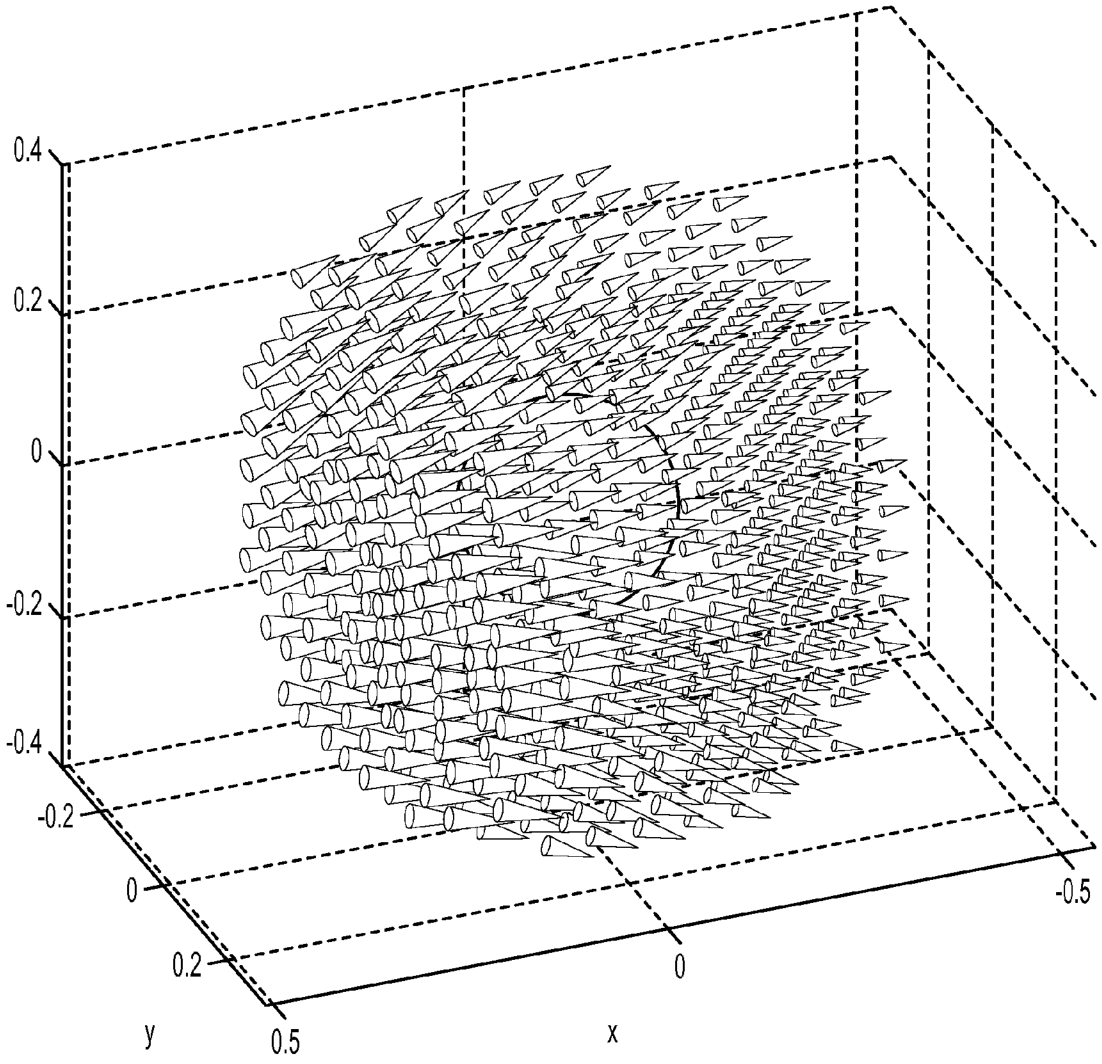
FIGS. 3A and 3B illustrate the volumetric intensity reconstruction using the method of FIG. 2 and calculated exact field, respectively, for a point source at a frequency of 200 Hz and a SNR of 30 dB.
Figure 3B:
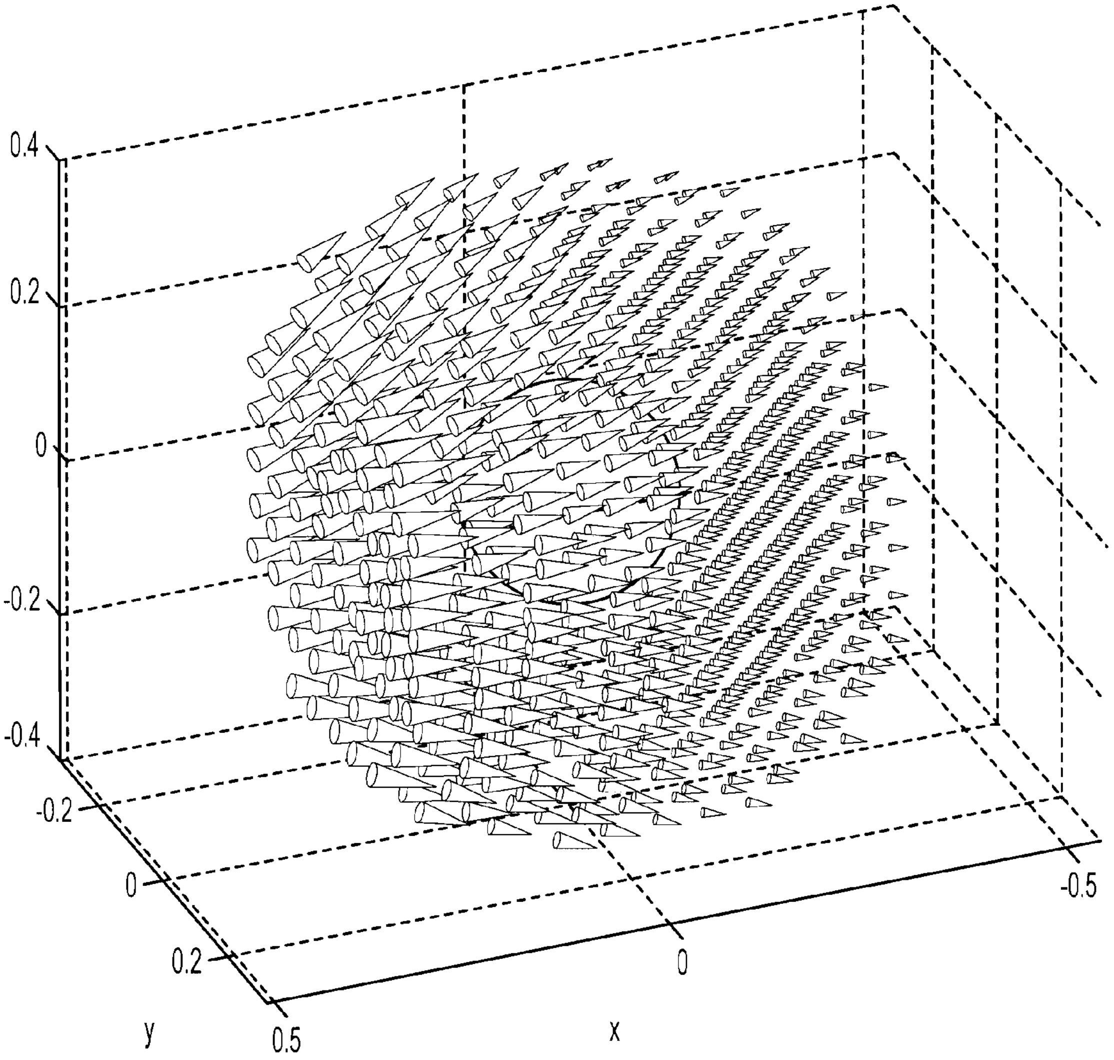
Figure 3C:
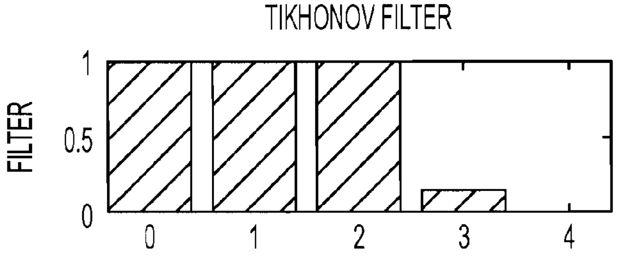
FIG. 3C illustrates the Tikonov filters used in reconstructing the vector acoustic intensity shown in FIG. 3A.

FIGS. 3A and 3B illustrate a display of test results comparing the volumetric intensity determined with a point source located at 1 meter from the center, at location r≡(1,0,0) compared to theoretical expected results. The frequency of interest in FIGS. 3A and 3B is 200 Hz and the SNR is 33 dB. The Tikhonov filter coefficients ($F_n^{\alpha}$) are shown in FIG. 3C, and vary between one and zero for n=0 to 4. FIG. 3A shows the results of the reconstruction of the acoustic vector intensity in accordance with the method of FIGS. 1 and 2 and the equations above. FIG. 3B shows the exact results expected, based solving the rigid scattering problem with a point source, as described in J. J. Bowman, T. B. A. Senior, and P. L. I. Uslenghi, "Electromagnetic and Acoustic Scattering by Simple Shapes", Hemisphere Publishing Corporation, N.Y., N.Y., 1987.

In both displays, the length of the cone is proportional to the strength of the intensity (watts/$m^2$) at that grid point. The cones are color coded to show the magnitude of the intensity level. The cones point in the direction of the resulting vector, so the location of the point source can be easily determined based on the direction of the intensity vectors.

Although results for only one frequency are shown (200 Hz), the output of the system can include a display for each frequency of interest, and/or displays of the results for octave bands, e.g., in ⅓ octave bands. A color display illustrates different intensities with different colors for different intensity levels, with a scale showing the correspondence between intensity level and color. The display is shown on a computer monitor screen, or any display screen or device receiving results from the processor that determines the vector intensity.

Figure 4A:
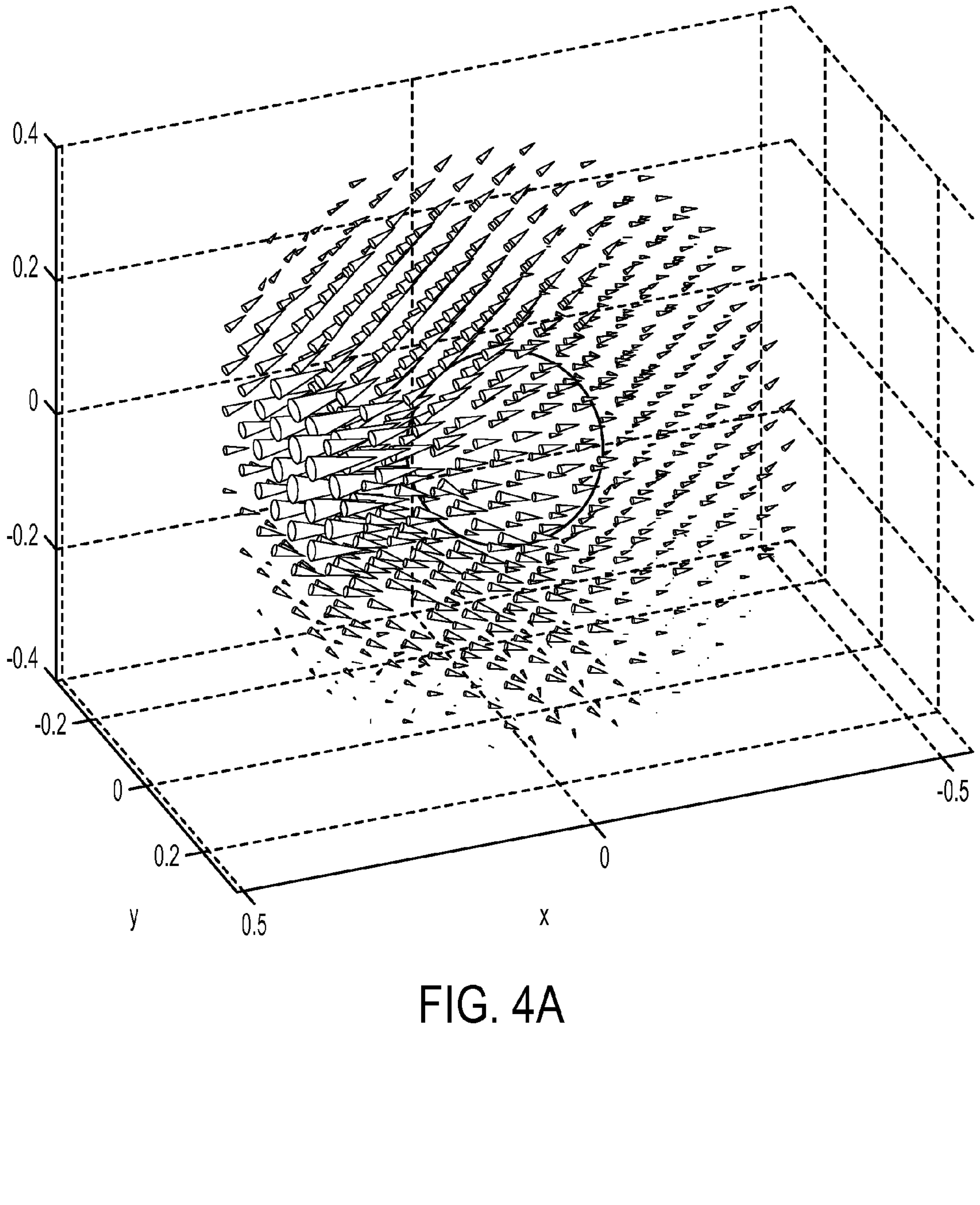
FIGS. 4A, 4B, and 4C illustrate the results for the point source considered in FIG. 3A-3C, at a frequency of 600 Hz and a signal to noise ratio of 31 dB.
Figure 4B:
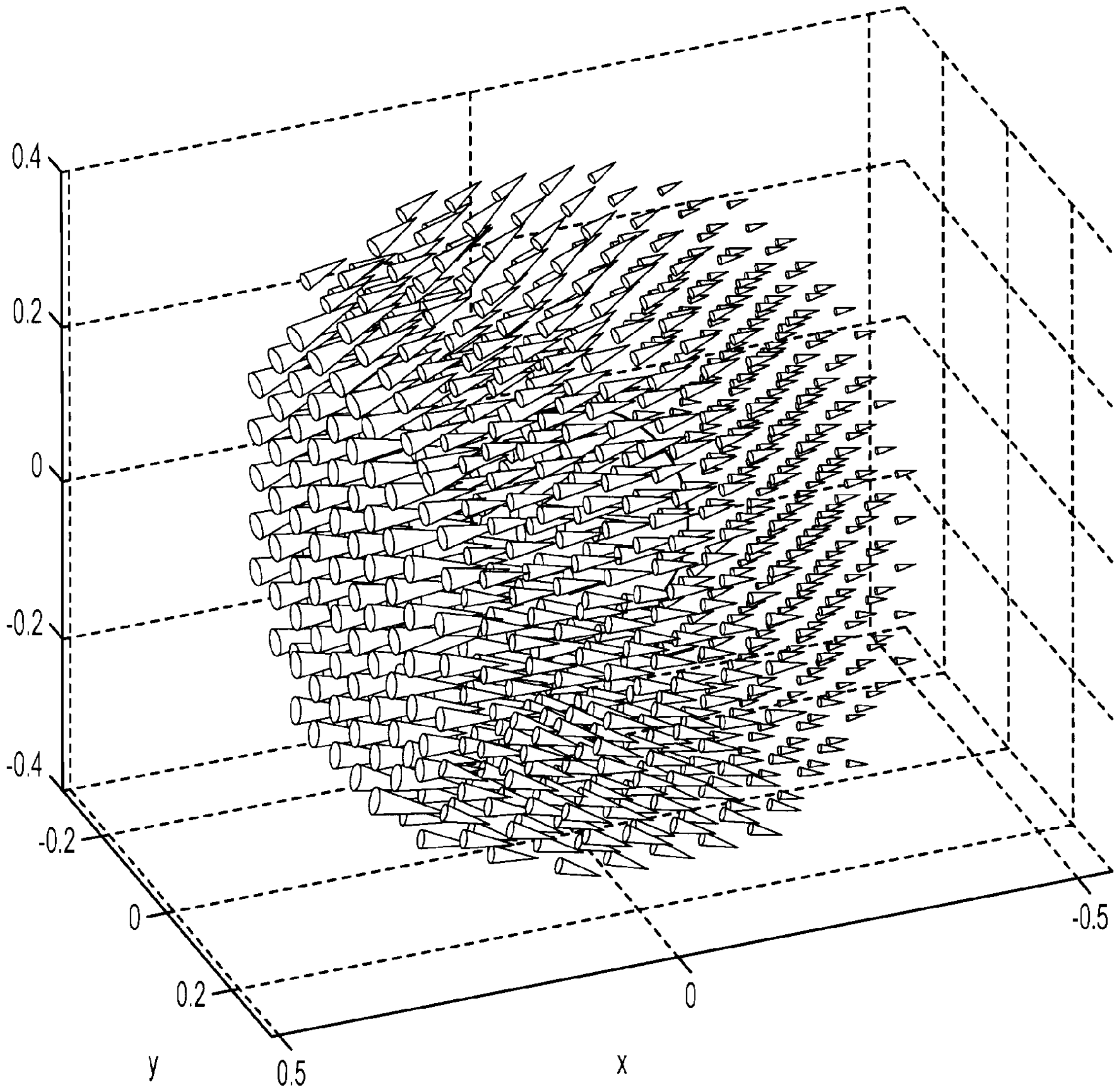

FIGS. 4A and 4B illustrate the results for 600 Hz, with a signal to noise ratio of 31 dB. Note that the Tikhonov filter values are 1 for all n (n=0, 1, 2, 3, and 4), and the alpha value a "α" is zero.

For the FIG. 3A and FIG. 3B 200 Hz reconstruction, the errors between the reconstructed vector acoustic intensity and the exact results are less than 30%. The errors in the FIG. 4A and FIG. 4B 600 Hz case are larger, e.g., about 62% at r=0.4 m.

Figure 4C:
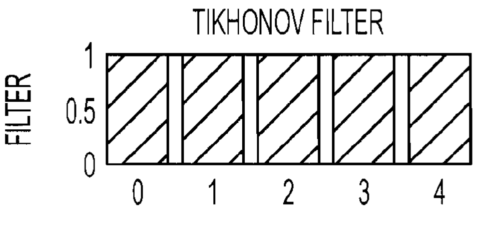

Note that for the 600 Hz case in FIG. 4A, the reconstructed intensity drops off more rapidly than the exact results in a direction circumferentially away from the point source. Thus, the high frequency reconstruction produces errors in the magnitude of the intensity. However, the high frequency reconstruction seems to have an improved ability to locate the acoustic source. The direction of the vectors point away from the point source, just as in the 200 Hz case. This effect seems to be triggered when the number of Fourier coefficients (N=4) is insufficient to accurately reconstruct the field. The Tikhonov filters in FIG. 3C and FIG. 4C indicate that only the n=0, 1, and 2 components are unfiltered for the 200 Hz case, while none of the n=0, 1, 2, 3, and 4 components were filtered in the 600 Hz case.

Figure 5:
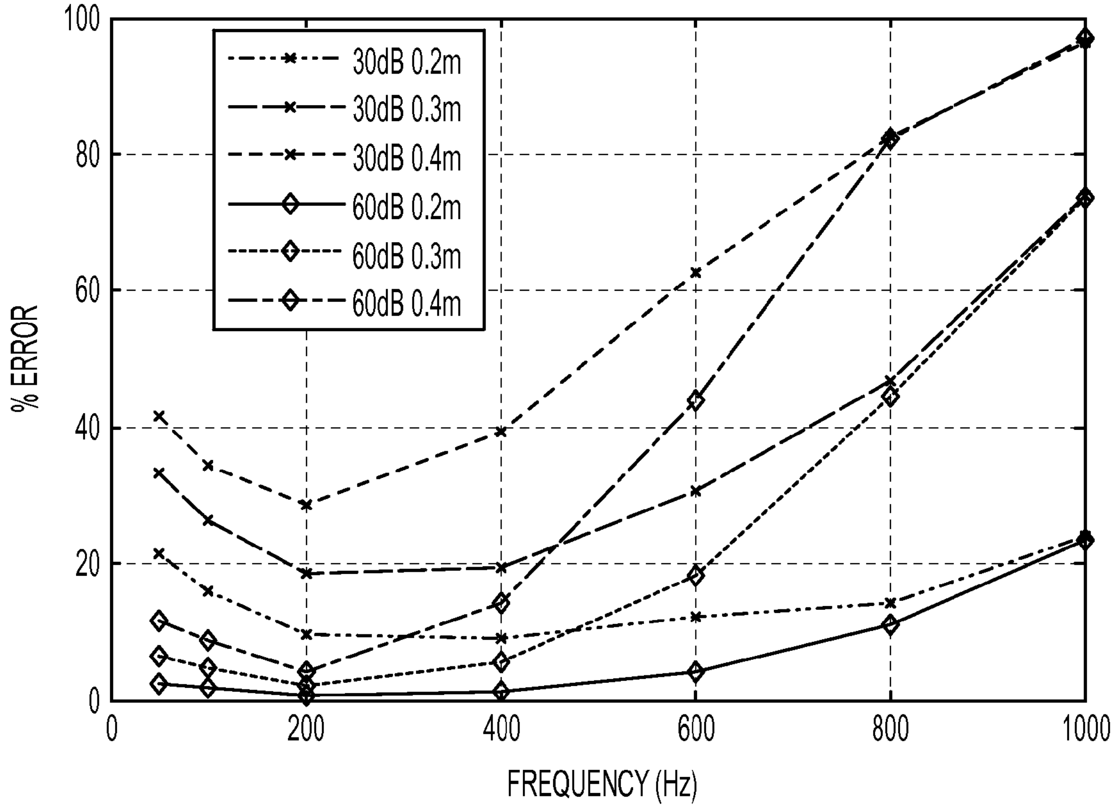
FIG. 5 illustrates reconstruction errors over a frequency band for signal to noise ratios of 30 and 60 dB at three different radii over a frequency band of 0 to 1000 Hz.

FIG. 5 illustrates the errors that result over a 0 to 1000 Hz frequency band, for signal to noise ratios of 30 and 60 dB, calculated at three different reconstruction radii (0.2 m, 0.3 m, and 0.4 m). The 30 dB, 0.2 m error is shown as curve 601. The 30 dB, 0.3 m error is shown as curve 602. The 30 dB, 0.4 m error is shown as curve 603. The 60 dB, 0.2 m error is shown as curve 604. The 60 db, 0.3 m error is shown as curve 605. The 60 dB, 0.4 m error is shown as curve 606. It is apparent that the errors increase for larger radii and higher frequencies. Noise primarily affects the error at lower frequencies, while at the highest frequencies, the error is dominated by the effect of having too few harmonics to predict the field accurately. At higher frequencies (e.g., 800 Hz), error can be reduced by using a spherical array with more microphones.

Figure 6A:
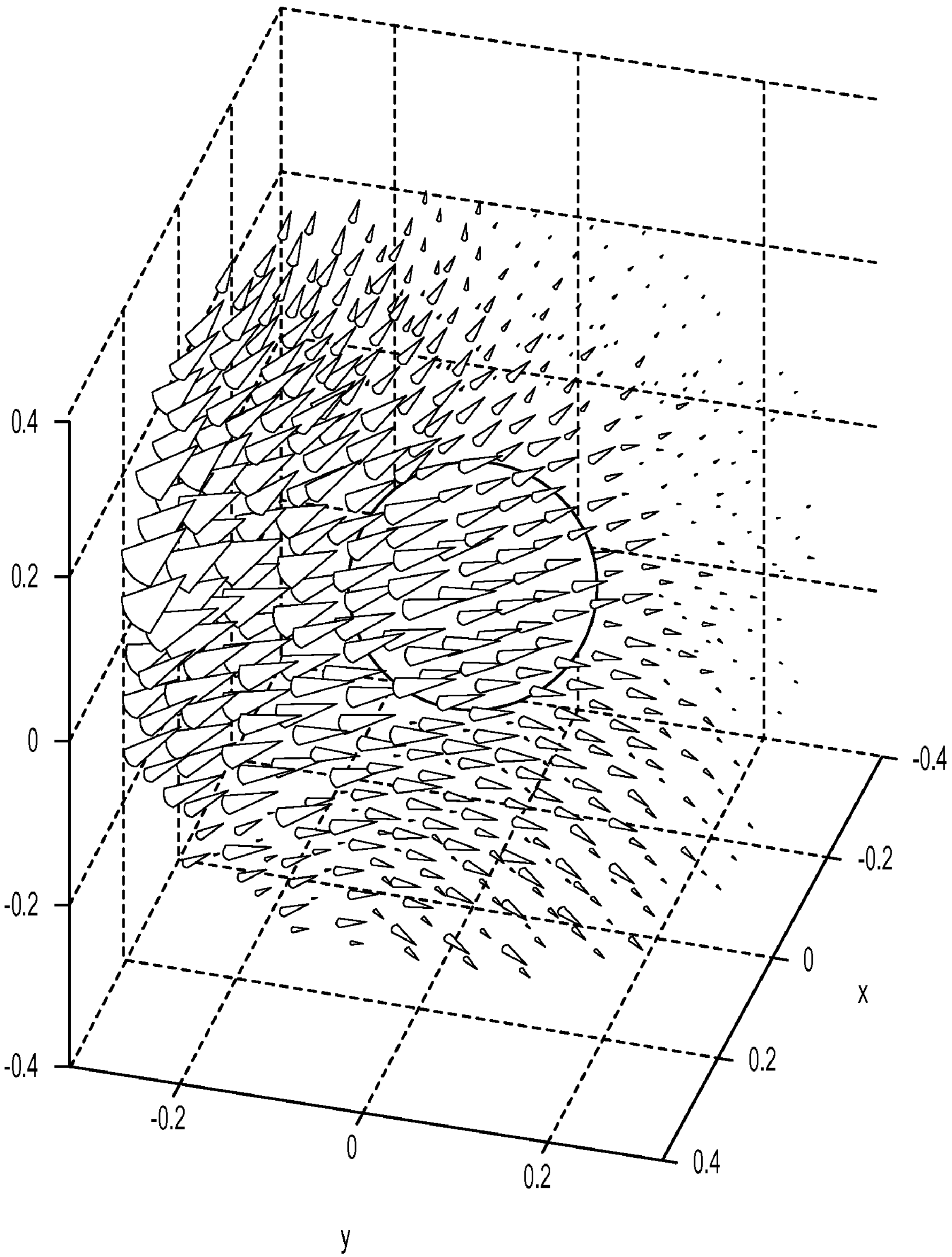
FIGS. 6A and 6B show reconstructions of the vector acoustic intensity related to point source reference signals on the left and on the right of the spherical array, respectively, at 200 Hz.
Figure 6B:
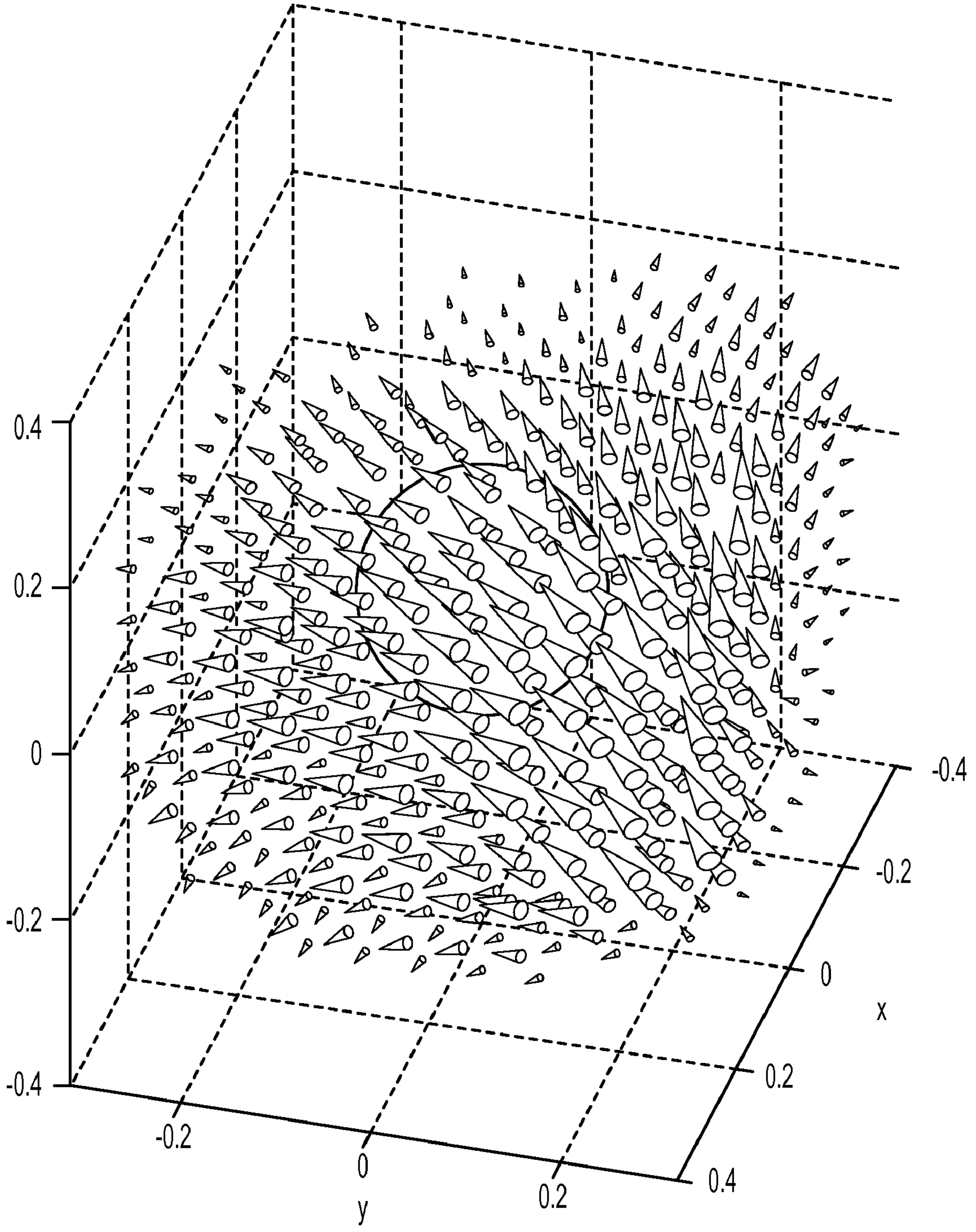

FIGS. 6A and 6B illustrate results of the vector acoustic intensity reconstruction related to a reference signal on the left and on the right of the spherical array, respectively, at 200 Hz. In this experimental demonstration, the reference signals are two point sources generated by two long tubes driven at the other end by sound generators. Intensity vectors are reconstructed on a rectangular lattice of 1331 points with equal spacing of 0.06 m extending over a cubical volume of 0.6 m on a side. The two sources are arranged at right angles to the center of the sphere and located at a distance of 0.28 m from the spherical array center. The spherical array is the 0.13 meter array manufactured by Nittobo. The noise sources were driven independently (uncorrelated) with random noise that is recorded to use as the reference. The signals from the microphones in the array are stored for later use in the reconstruction method of FIGS. 1 and 2. In the front end signal processor, the cross spectral densities between the 31 microphones and the two reference signals are computed using ensemble averaging using a 1024 point FFT and 58 overlapping ensembles. With a sample rate of 12 kHz, each ensemble consisted of 0.85 seconds of data. Using the partial field decomposition technique, holograms are produced correlated to each source at selected frequencies. The two holograms are then processed separately, and the intensity vector fields displayed on a computer screen.

Figure 7A:
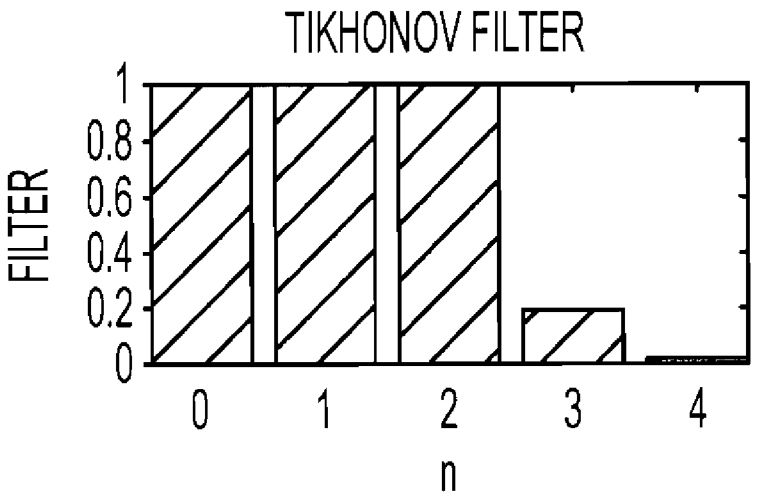
FIGS. 7A and 7B show the Tikhonov filter coefficients for the left and right reconstructions of FIGS. 6A and 6B, respectively.
Figure 7B:
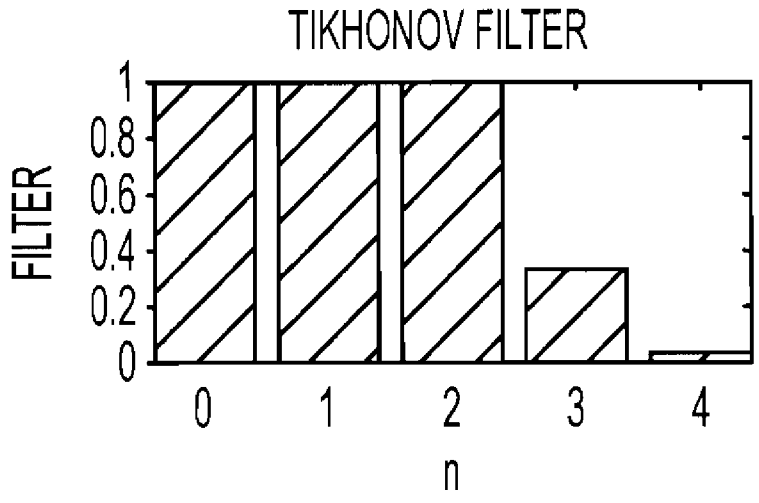

FIGS. 7A and 7B show the Tikhonov filter coefficients for the left and reconstructions of FIGS. 6A and 6B, respectively, based on noise calculated from the nine harmonics (n=4 with m=−4, −3, . . . , 4) using the Morozov discrepancy principle to determine the value of alpha "α" in the filter.

Figure 8A:
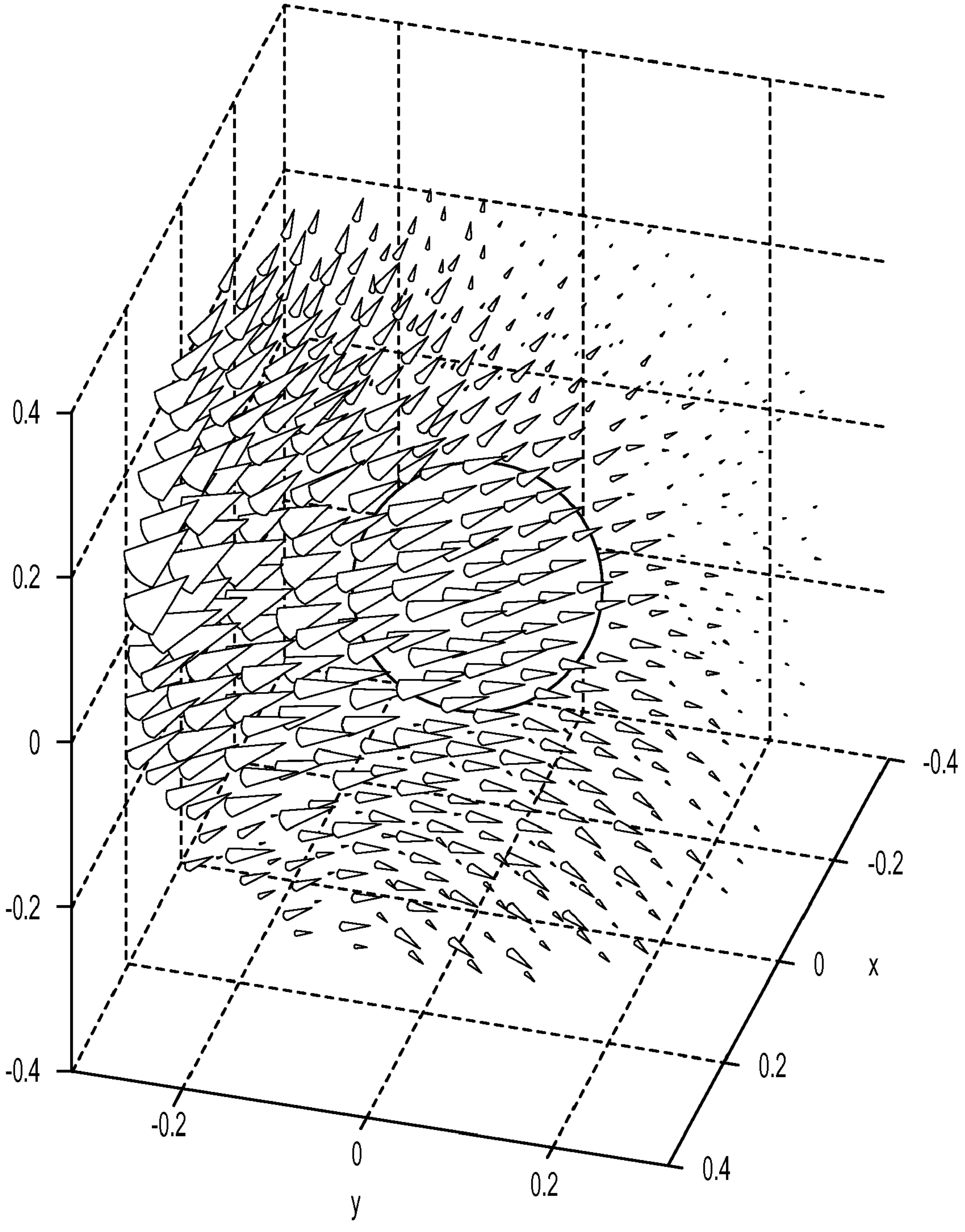
FIGS. 8A and 8B illustrate the computed intensity fields from the partial field holograms of the left and right acoustic sources at 600 Hz.
Figure 8B:
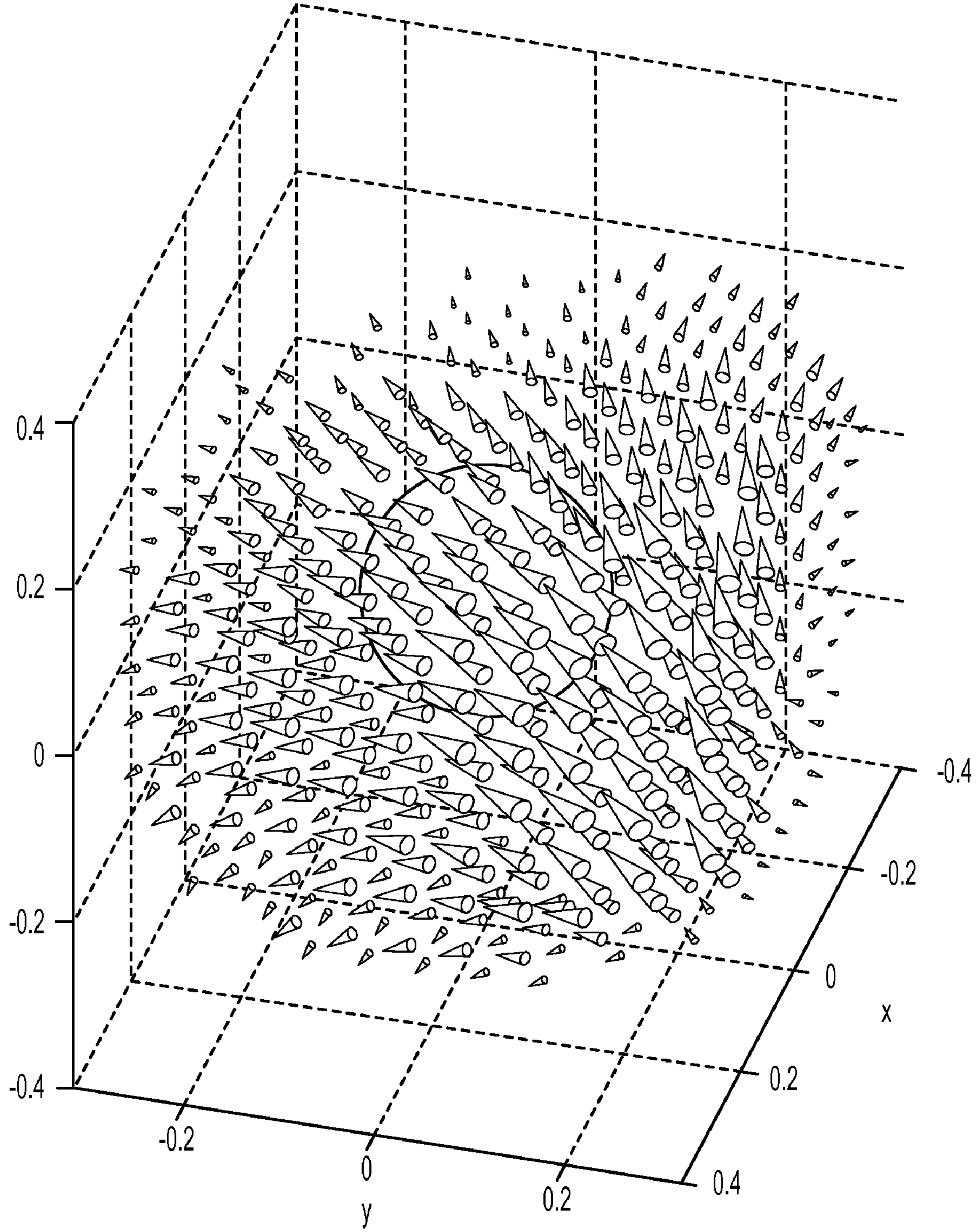

FIGS. 8A and 8B illustrate the computed intensity field from the partial field holograms of the left and right acoustic sources, respectively, at 600 Hz. In this high frequency case, no Tikhonov filter is necessary. The results of FIGS. 8A and 8B show an effect similar to that shown in FIG. 4B, e.g., the reconstructed intensity is too high at locations close to the location of the actual source. With more harmonics, it is expected that the reconstructed acoustic vector intensity images will correspond more closely with the exact results. However, the number of microphones would need to be larger in order to measure more harmonics. Further, as discussed above, source localization is improved with fewer harmonics, albeit at a sacrifice of some accuracy in the reconstructed intensity level.

Figure 9A:
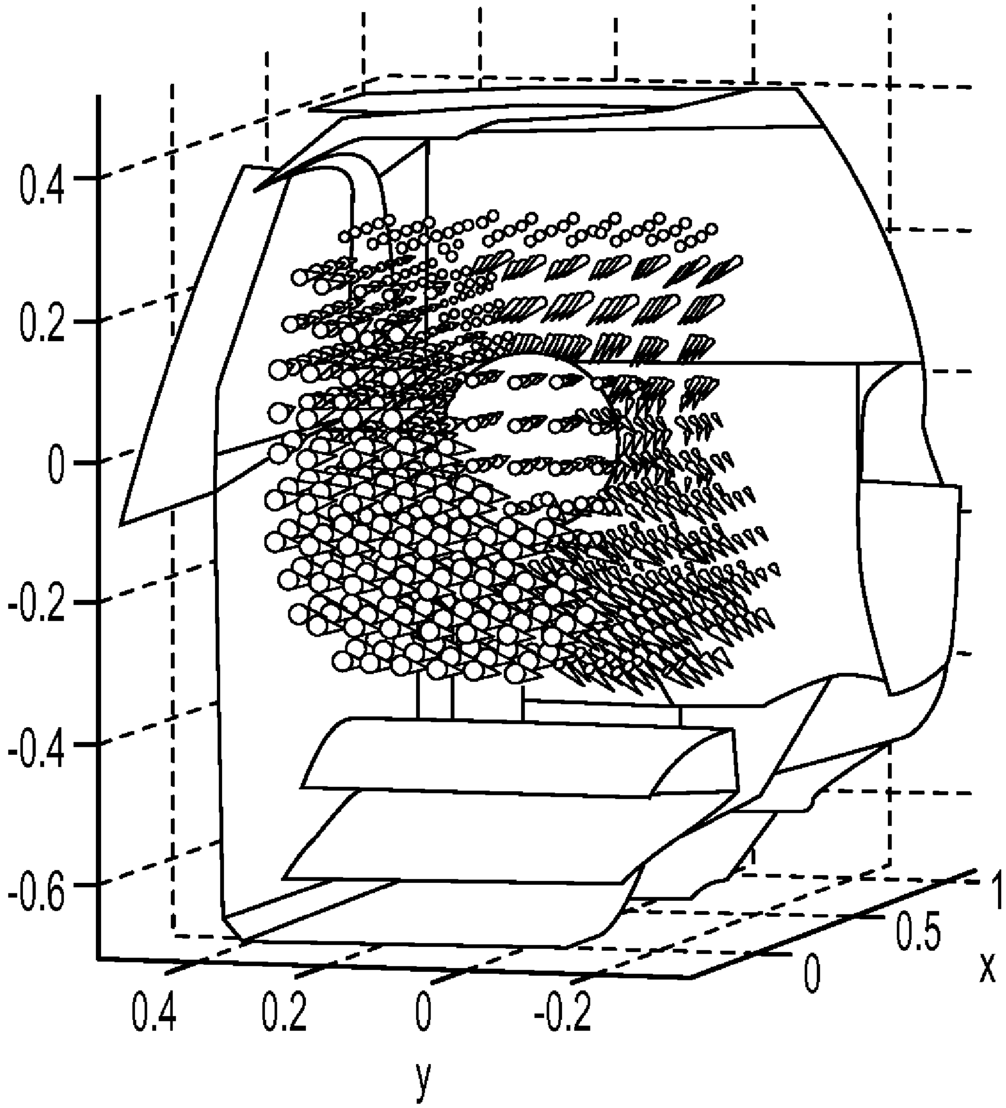
FIGS. 9A and 9B illustrate reconstructed vector acoustic intensity overlaid on an image of the automobile compartment, driver's side window, and windshield for data collected inside an automobile driver compartment.
Figure 9B:
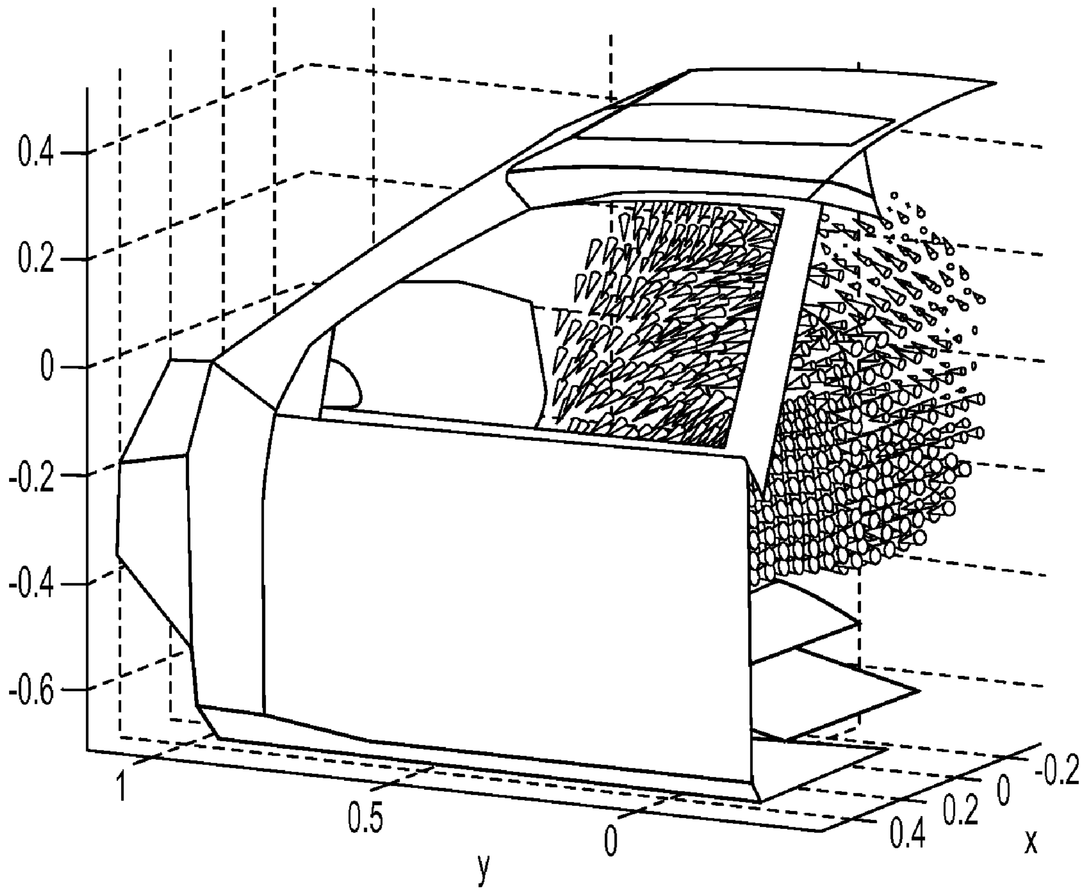

FIG. 9A-9E show a demonstration of the method for determining the noise source in an automobile. The rigid 31-microphone Nittobo acoustic array is placed at the driver's area inside an automobile driven on a dynamometer at 3000 rpm and a reference accelerometer is placed on the engine block. The entire automobile is located in an anechoic chamber. FIGS. 9A and 9B illustrate the reconstructed vector acoustic intensity overlaid on an image of the automobile compartment, driver's side window, and windshield. The vector acoustic intensity is evaluated at 105 Hz, the fundamental of the engine tonal. The measured pressure hologram correlates very highly to the engine block accelerometer. The mean sound pressure level is about 89 dBA at 105 Hz.

Figure 9C:
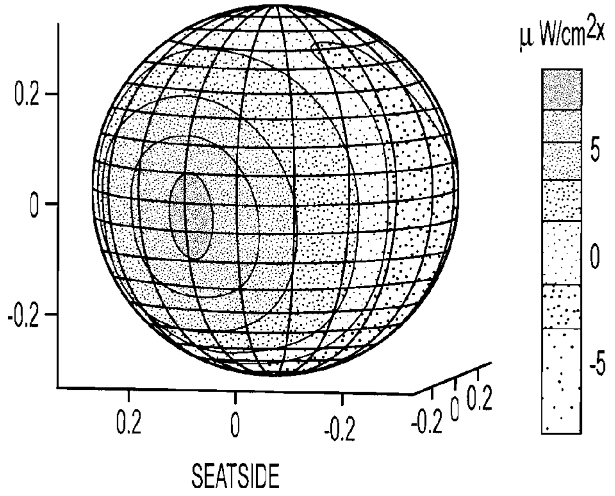
FIGS. 9C and 9D show the radial acoustic intensity corresponding to FIGS. 9A and 9B as color variations on an imaginary sphere of radius 0.3 m, centered at the center of the spherical array.
Figure 9D:
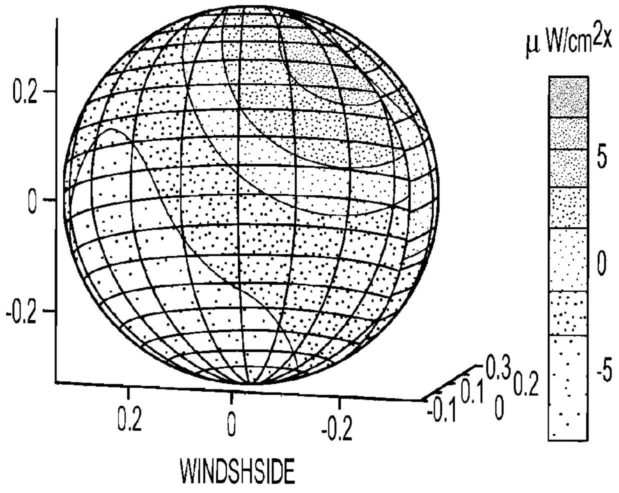

FIGS. 9C and 9D show the radial acoustic intensity as color changes on an imaginary sphere of radius 0.3 m, centered at the center of the spherical array. The colors on the sphere represent the radial intensity of the vector acoustic intensity at the points on the sphere. In these figures, red indicates sound entering the sphere and blue indicates sound leaving the sphere in microWatts per square centimeter.

Figure 9E:
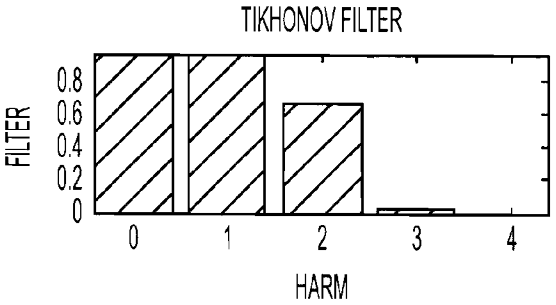
FIG. 9E shows the Tikhonov filter coefficients for the demonstration of FIG. 9A-9E.
Figure 10A:
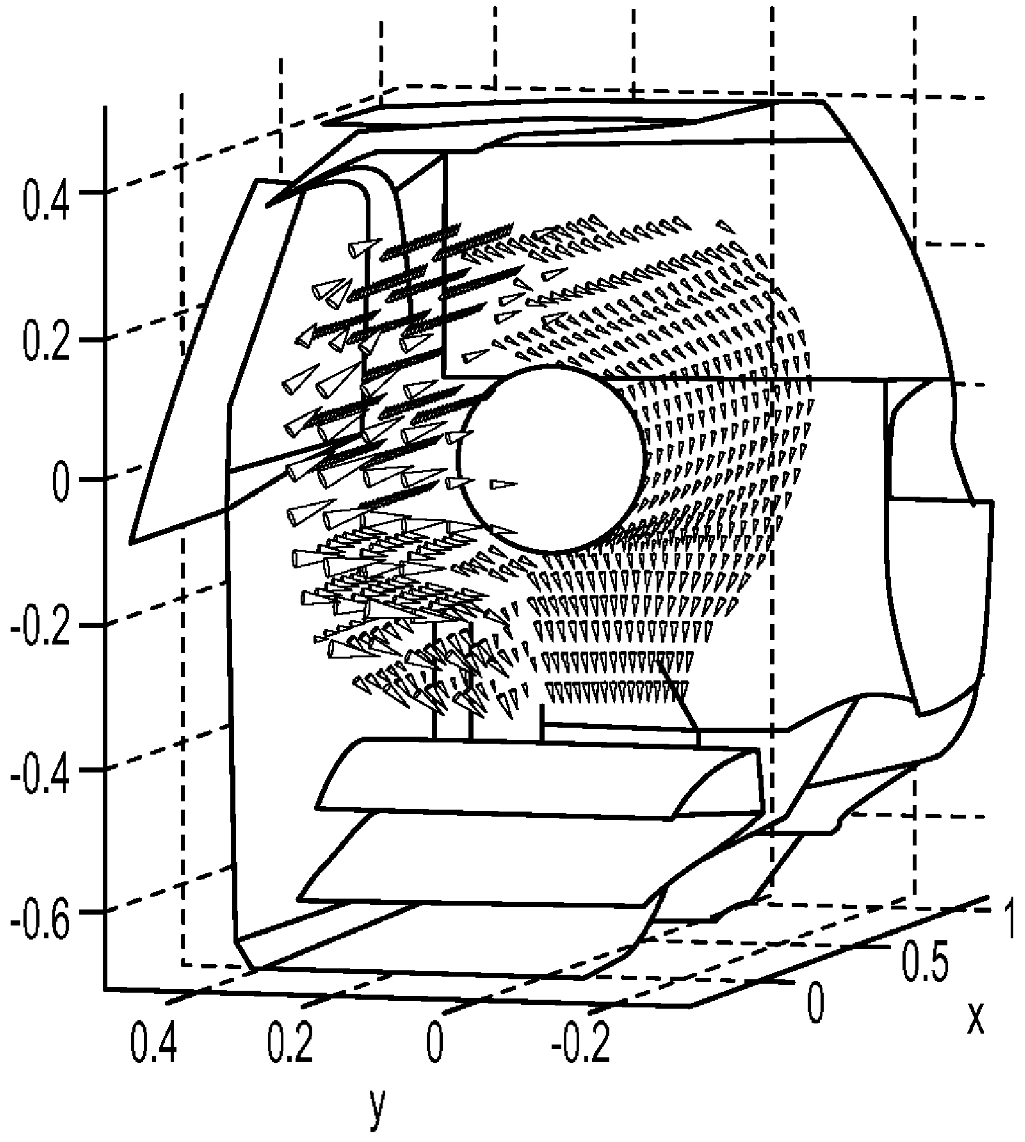
FIG. 10A-10E show results corresponding to FIG. 9A-9E with a higher signal to noise ratio.
Figure 10B:
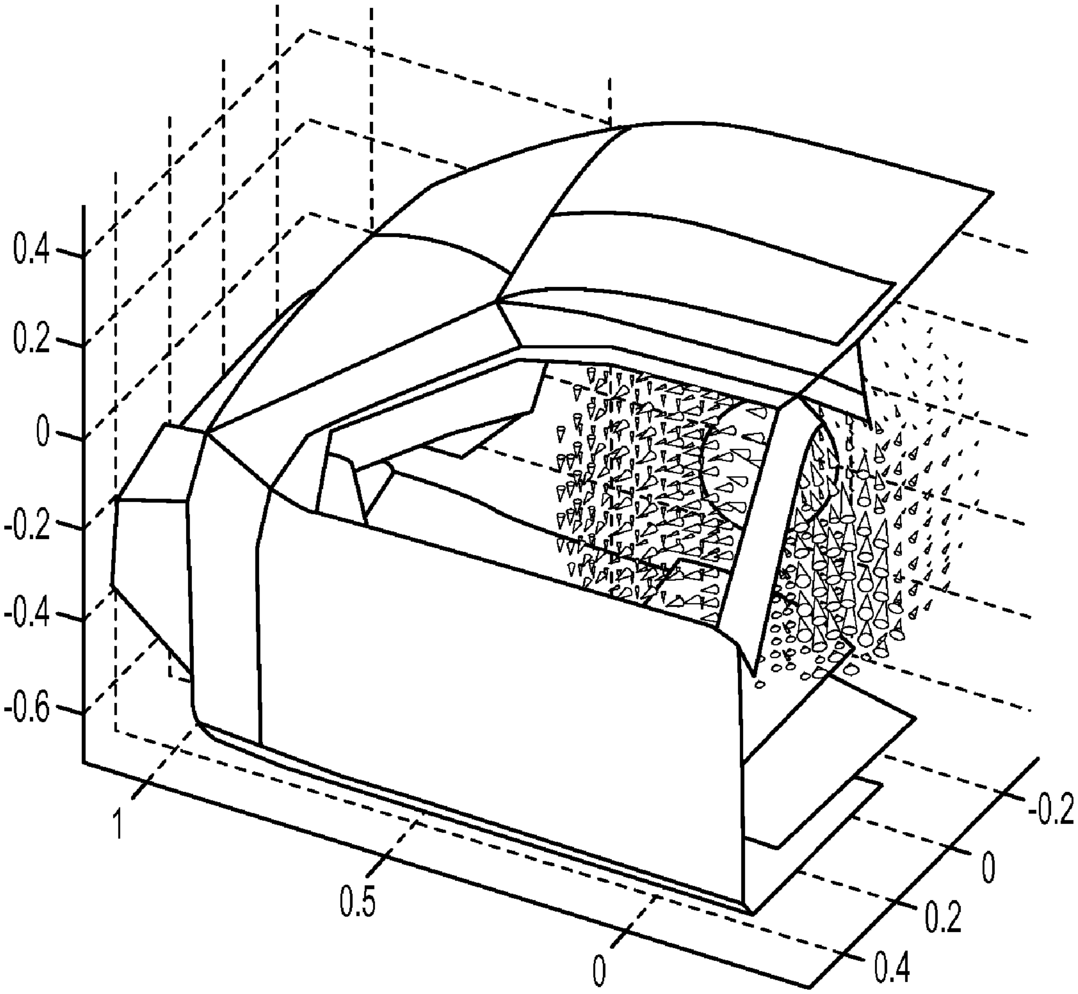
Figure 10C:
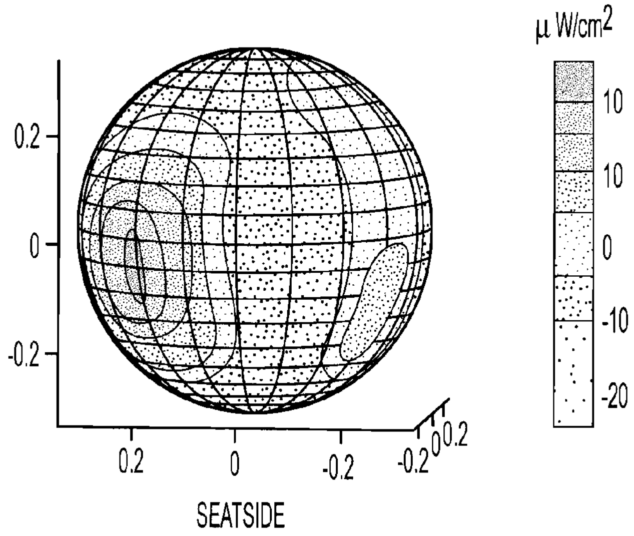
Figure 10D:
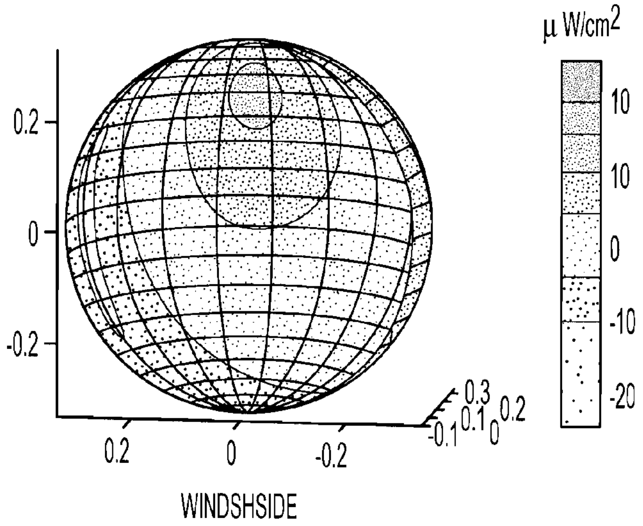
Figure 10E:
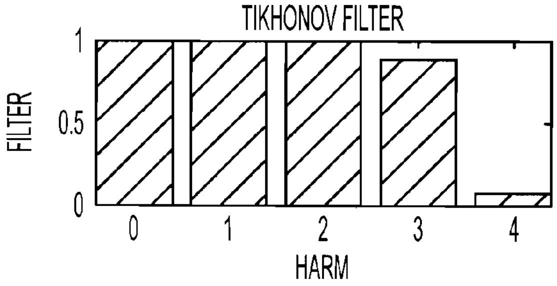

In FIG. 9C, a large influx of acoustic power is apparent in red, entering from the left of the back seat of the automobile cabin. In FIG. 9D, the colored sphere also indicates in orange an inward flow of power at a low level coming from the windshield. The large outflow of power is shown in deep blue in an area near the left under-dash and floor area. FIG. 9E shows the Tikhonov filter coefficients for the 105 Hz case.

Note that at 105 Hz, the acoustic wavelength is greater than 3.2 m, and the vector display covers a cube 0.6 meters on each side, corresponding to about one fifth of a wavelength. The displayed field presents a spatial resolution that is much better than the normal half-wavelength obtainable with standard techniques such as beamforming.

In another demonstration using the same automobile test equipment, the signal to noise ratio is increased by 6 dB over the estimate given by Morozov from the n=4 harmonics, and the intensity is reconstructed for 105 Hz. Results are shown in FIG. 10A-FIG. 10E. Note that increasing the harmonic contributions for the higher n terms provides a more concentrated intensity, yielding a more precise indication of the interior noise source. The source appears to be near the back door, rather than near the rear seat.

Since the intensity reconstructions of FIGS. 1 and 2 are very fast, it is convenient for a user to adjust the SNR parameter and display the resulting fields, to more precisely identify the noise sources.

The system can also include means for a user to manually adjust the SNR in order to better localize the noise source. The means can be a manual knob, a computer graphical user interface, or another device.

Note that when a rigid sphere is placed near a boundary, the sphere can change the impedance of the boundary and alter the intensity flow pattern, particularly since the normal component of the intensity must vanish at the rigid sphere surface.

A microphone is an acoustic-to-electric transducer or sensor that converts sound or pressure into an electrical signal. A microphone can include a thin membrane which vibrates in response to sound pressure. This movement is subsequently translated into an electrical signal. Some microphones use electromagnetic induction (dynamic microphone), capacitance change (condenser microphone), piezoelectric generation, or light modulation to produce the signal from mechanical vibration. The microphones can also be integral to the rigid sphere. For example, the hard surface can serve as a circuit board, coated with a large array of PVDF film microphones or MEMs microphones. The microphones 102 can be any desired sensor for determining acoustic pressure. Examples of suitable microphones include hearing aid microphones, cartridge type microphones, or other microphones. The microphones should be matched in their response as much as possible. One example of a suitable microphone is model 7046I, available from Aco Pacific, Inc. of Belmont, Calif.

The method described herein transforms the microphone signals into data representing the magnitude and direction of the acoustic intensity at different locations within a volume outside the microphone array. The data is suitably displayed to a viewer in various forms, including as graphical vectors whose size, color, position, and direction indicate the acoustic intensity and direction of the noise source. The displayed vectors can also be overlaid on an image of the machinery and other structure within the test volume. The data can also be stored for further examination and processing, printed, communicated to another device, or imported as into a noise cancellation system.

When linked with commercially available hardware this method provides real-time imaging of the acoustic intensity vector in a volume surrounding the array. There is no restriction on the number of microphones used or their locations on the spherical surface. The spatial map of the intensity vector points away from the sources and thus can be used to identify the location and strength of the sources. This approach is ideally suited for noise control identification during operation in interior spaces such as automotive cabs and aircraft interiors.

The processing steps described herein are believed to have advantages of other methods of analyzing acoustical data from spherical microphone arrays. For example, beamforming methods can be used to analyze such acoustical data. As discussed above, the spherical nearfield acoustic holographic method described herein has a higher spatial resolution than beamforming methods.

Another system for determining vector acoustic intensity is described in U.S. Pat. No. 7,599,248. That system relies upon input from an acoustically transparent spherical acoustic array having a particular number of microphones positioned at particular points on a sphere so that the spherical harmonics of the partial fields can be integrated exactly using quadrature weights in the processing steps. In contrast, the system described and shown herein does not require any specific number, pattern, or location of microphones in the spherical array, and the processing steps can be applied to signals from any spherical array having a reflective interior boundary.

High frequency operation can be improved by using denser microphone arrays.

The system described in U.S. Pat. No. 7,599,248 can be considered to have a Green's function ratio of $$\frac{G_n(r)}{G_n(a)} = \frac{j_n(kr)}{j_n(ka)},$$

which produces very different results than the present system. Further, the system of U.S. Pat. No. 7,599,248 has the additional requirement that the values of n and ka where $j_n(ka) \approx 0$ must be excluded from the summations for pressure and velocity, reducing the accuracy of the reconstructions. Thus, the novel system described herein is believed to be more accurate and robust than the open sphere system of U.S. Pat. No. 7,599,248.

The method described herein also accounts for the diffraction around the sphere in the formulation whereas diffraction due to the structure of the open sphere can not be removed in the formulation in U.S. Pat. No. 7,599,248. Furthermore, use of a rigid sphere rather than an open sphere allows cabling and storage of much of the electronics inside the sphere without effecting the operation.

Exemplary embodiments are directed to computer based systems for implementing the methods described herein. Such a system can include the spherical array illustrated in FIG. 1, an analog to digital computer, a front end signal processor, and a computer processor having software for accomplishing the front end signal processing and nearfield acoustical holography calculations, and a display device. The system can also include memory or storage for storing raw data, intermediate results, or final results for later processing, an output device for transmitting raw data, intermediate results, or final results to different computer or to another device, or a printer for printing the results. Communications devices can be wired or wireless.

Portions of the system operate in a computing operating environment, for example, a desktop computer, a laptop computer, a mobile computer, a server computer, and the like, in which embodiments of the invention may be practiced. A brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. An illustrative operating environment for embodiments of the invention will be described. A computer comprises a general purpose desktop, laptop, handheld, mobile or other type of computer (computing device) capable of executing one or more application programs. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller connected to the bus. The mass storage device and its associated computer-readable media provide non-volatile storage for the computer. Although the description of computer-readable media contained herein refers to a mass storage device, such as a hard disk or CD-ROM drive, it should be appreciated by those skilled in the art that computer-readable media can be any available tangible physical media that can be accessed or utilized by the computer.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, and magnetic disk storage or other magnetic storage devices.

According to various embodiments of the invention, the computer may operate in a networked environment using logical connections to remote computers through a network, such as a local network, the Internet, etc. for example. The computer may connect to the network through a network interface unit connected to the bus. It should be appreciated that the network interface unit may also be utilized to connect to other types of networks and remote computing systems. The computer may also include an input/output controller for receiving and processing input from a number of other devices, including a keyboard, mouse, or other device. Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as a software application, for example, a word processing application, a spreadsheet application, a slide presentation application, a database application, etc.

It should be appreciated that various embodiments of the present invention may be implemented as a sequence of computer implemented acts or program modules running on a computing system and/or as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as described herein.

The foregoing provides examples of a system for determining vector acoustic intensity fields using a spherical array of acoustic sensors, and a regularization technique that is useful for low frequencies. Obviously, many modifications and variations of the present invention are possible in light of the above teachings. It is therefore to be understood that the claimed invention may be practiced otherwise than as specifically described.

What is claimed as new and desired to be protected by Letters Patent of the United States is:

1. A system for determining vector acoustic intensity at locations in a volume external to a spherical array of microphones, the array of microphones having an acoustically reflective frame, the system comprising:

an analog to digital converter for digitizing pressure data from each microphone in the spherical array and for digitizing data from at least one reference microphone or accelerometer exterior to the array; and a computer processor for determining the acoustic intensity at each location, the processor having computer software adapted to apply a propagator to spherical wave equations for pressure and velocity to determine the vector acoustic intensity, the propagator including a regularization filter and a ratio of Green's functions for the location r and for the spherical array radius a.

2. The system according to claim 1, wherein the regularization filter depends on a frequency and a signal to noise ratio at the microphone locations.

3. The system according to claim 1, wherein the regularization filter has regularization filter coefficients of 0, 1, or a fraction between 0 and one.

4. The system according to claim 3, wherein the regularization filter results from applying from Tikhonov regularization to the spherical geometry of the array and a Morozov discrepancy principle to measured noise variance and Fourier coefficients.

5. The system according to claim 1, wherein the spherical wave equation is a spherical wave equation for pressure and the propagator is $$\sum_{n=0}^{N} F_n^\alpha \frac{G_n(r)}{G_n(a)},$$

$F_n^\alpha$ is the regularization filter, and $$\frac{G_n(r)}{G_n(a)}$$

is a ratio of Green's function for the location r and a spherical array radius a.

6. The system according to claim 1, wherein the spherical wave equation is a spherical wave equation for velocity in a θ or ϕ direction, the propagator is $$\sum_{n=0}^{N} F_n^\alpha \frac{G_n(r)}{rG_n(a)},$$

$F_n^\alpha$ is the regularization filter coefficient, and $$\frac{G_n(r)}{G_n(a)}$$

is a ratio of Green's function for the location r and a spherical array radius a.

7. The system according to claim 1, wherein the spherical wave equation is a spherical wave equation for velocity in an R direction, the propagator is $$\sum_{n=0}^{N} F_n^\alpha \frac{G'_n(r)}{rG_n(a)},$$

$F_n^\alpha$ is the regularization filter coefficient, and $$\frac{G_n(r)}{G_n(a)}$$

is a ratio of Green's functions for the location r and a spherical array radius a.

8. The system according to claim 1, wherein the acoustic intensity is determined at locations within a volume having a radius between one and four times the radius of the spherical array of microphones.

9. The system according to claim 1, wherein the acoustic velocities at a location r are found according to $$v_\theta(r,\omega) = \frac{1}{i\omega\rho}\sum_{n=0}^{N} F_n^\alpha \frac{G_n(r)}{rG_n(a)} \sum_{m=-n}^{n} P_{mn}(a,\omega)\partial Y_n^m(\theta,\phi)/\partial\theta,$$

$$v\phi(r,\omega) = \frac{1}{i\omega\rho}\sum_{n=0}^{N} F_n^\alpha \frac{G_n(r)}{rG_n(a)} \sum_{m=-n}^{n} P_{mn}(a,\omega) i m Y_n^m(\theta,\phi)/\sin(\theta),$$

and $$v_R(r,\omega) = \frac{1}{i\omega\rho}\sum_{n=0}^{N} F_n^\alpha \frac{G'_n(r)}{G_n(a)} \sum_{m=-n}^{n} P_{mn} Y_n^m(\theta,\phi),$$

wherein v(r,ω) is reconstructed acoustic pressure at a location r,θ,ϕ in a direction θ,ϕ, or R at a frequency ω, $P_{mn}$ are Fourier coefficients of the measured partial pressure with respect to a reference source, the $Y_n^m(\theta,\phi)$ values are orthonormal spherical harmonic functions of degree n and order m at a point in the volume at angle (θ,ϕ), and ρ is the density of the media in which the microphones are located.

10. The system according to claim 1, wherein acoustic pressure at the location r and frequency ω is found as $$p(r,\omega)=\sum_{n=0}^{N}F_n^{\alpha}\frac{G_n(r)}{rG_n(a)}\sum_{m=-n}^{n}P_{mn}(a,\omega)Y_n^m(\theta,\phi),$$

wherein p (r,ω) is reconstructed acoustic pressure at a location r in a at a frequency ω, $P_{mn}$ are Fourier coefficients of the partial pressure with respect to the reference source, the $Y_n^m$ (θ,ϕ) values are orthonormal spherical harmonic functions of degree n and order m at a point in the volume at angle (θ,ϕ), and ρ is the density of the media in which the microphones are located.

11. The system according to claim 1, further comprising:

a display device connected to an output of the processor and adapted to show magnitude and direction of the vector acoustic intensity at the locations outside the spherical array.

12. A computer implemented method for determining vector acoustic intensity at locations in a volume external to a spherical array of microphones, the array of microphones having an acoustically reflective frame, the method comprising:

receiving from an analog to digital converter digitized pressure data from each microphone in the spherical array and digital data from at least one reference microphone or accelerometer exterior to the array; applying a propagator to spherical wave equations for pressure and velocity to determine the vector acoustic intensity, the propagator including a regularization filter and a ratio of Green's functions for the location r and for the spherical array radius a.

13. The computer implemented method according to claim 12, further comprising:

the analog to digital converter receiving analog electrical signals from the plurality of microphones and converting the analog electrical signals into digital signals.

14. The method according to claim 12, wherein the regularization filter depends on a frequency and a signal to noise ratio at the microphone locations.

15. The method according to claim 12, wherein the regularization filter has filter coefficients of 0, 1, or a fraction between 0 and one.

16. The method according to claim 12, wherein the regularization filter results from applying from Tikhonov regularization to the spherical geometry of the array and the Morozov discrepancy principle to measured noise variance and Fourier coefficients.

17. The method according to claim 12, wherein the spherical wave equation is a spherical wave equation for pressure and the propagator is $$\sum_{n=0}^{N}F_n^{\alpha}\frac{G_n(r)}{G_n(a)},$$

$F_n^{\alpha}$ is the regularization filter, and $$\frac{G_n(r)}{G_n(a)}$$

is a ratio of Green's function for a location r and a spherical array radius a.

18. The method according to claim 12, wherein the spherical wave equation is a spherical wave equation for velocity in a θ or ϕ direction, the propagator is $$\sum_{n=0}^{N}F_n^{\alpha}\frac{G_n(r)}{rG_n(a)},$$

$F_n^{\alpha}$ is the regularization filter coefficient, and $$\frac{G_n(r)}{G_n(a)}$$

is a ratio of Green's function for a location r and a spherical array radius a.

19. The method according to claim 12, wherein the spherical wave equation is a spherical wave equation for velocity in an R direction, the propagator is $$\sum_{n=0}^{N}F_n^{\alpha}\frac{G_n'(r)}{G_n(a)},$$

$F_n^{\alpha}$ is the regularization filter coefficient, and $$\frac{G_n(r)}{G_n(a)}$$

is a ratio of Green's functions for a location r and a spherical array radius a.

20. The method according to claim 12, wherein the acoustic intensity is determined at locations within a volume having a radius between one and four times the radius of the spherical array of microphones.

21. The method according to claim 12, wherein the acoustic velocities at a location r are found according to $$v_\theta(r,\omega)=\frac{1}{i\omega\rho}\sum_{n=0}^{N}F_n^{\alpha}\frac{G_n(r)}{rG_n(a)}\sum_{m=-n}^{n}P_{mn}(a,\omega)\partial Y_n^m(\theta,\phi)/\partial\theta,$$

$$v\phi(r,\omega)=\frac{1}{i\omega\rho}\sum_{n=0}^{N}F_n^{\alpha}\frac{G_n(r)}{rG_n(a)}\sum_{m=-n}^{n}P_{mn}(a,\omega)imY_n^m(\theta,\phi)/\sin(\theta),$$

and $$v_R(r,\omega)=\frac{1}{i\omega\rho}\sum_{n=0}^{N}F_n^{\alpha}\frac{G_n'(r)}{G_n(a)}\sum_{m=-n}^{n}P_{mn}Y_n^m(\theta,\phi),$$

wherein v(r,ω) is reconstructed acoustic pressure at a location r,θ,ϕ in a direction θ,ϕ, or R at a frequency ω, $P_{mn}$ are Fourier coefficients of the partial pressure with respect to the reference source, the $Y_n^m$(θ,ϕ) values are orthonormal spherical harmonic functions of degree n and order m at a point in the volume at angle (θ,ϕ), and ρ is the density of the media in which the microphones are located.

22. The method according to claim 12, wherein acoustic pressure at a location r and frequency ω is found as $$p(r,\omega)=\sum_{n=0}^{N}F_n^{\alpha}\frac{G_n(r)}{G_n(a)}\sum_{m=-n}^{n}P_{mn}(a,\omega)Y_n^m(\theta,\phi),$$

wherein p (r,ω) is reconstructed acoustic pressure at a location r at a frequency ω, $P_{mn}$ are Fourier coefficients of the partial pressure with respect to the reference source, the $Y_n^m(\theta,\phi)$ values are orthonormal spherical harmonic functions of degree n and order m at a point in the volume at angle (θ,ϕ), and ρ is the density of the media in which the microphones are located.

23. The method according to claim 12, further comprising:

displaying on a computer screen the magnitude and the direction of the vector acoustic intensity at the locations outside the spherical array.

24. The method according to claim 23, wherein magnitude of the vector acoustic intensity is represented by the length of a cone pointing along the direction of the vector acoustic intensity.

25. The method according to claim 24, wherein the magnitude of the vector acoustic intensity is represented by a variation in color of the cones.

26. A non-transitory computer readable medium having stored thereon instructions for determining vector acoustic intensity at locations in a volume external to a spherical array of microphones, the array of microphones having an acoustically reflective frame, said instructions including steps for:

receiving from an analog to digital converter digitized pressure data from each microphone in the spherical array and digital data from at least one reference microphone or accelerometer exterior to the array; and applying a propagator to spherical wave equations for pressure and velocity to determine the vector acoustic intensity, the propagator including a regularization filter and a ratio of Green's functions for the location r and for the spherical array radius a.

* * * * *